US012549988B2

(12) United States Patent
Agarwal et al.

(10) Patent No.: US 12,549,988 B2
(45) Date of Patent: Feb. 10, 2026

(54) OPPORTUNISTIC REPORTING TECHNIQUES FOR DEVICES HAVING INCREASED QUANTITIES OF RECEPTION CHAINS

(71) Applicant: QUALCOMM Incorporated, San Diego, CA (US)

(72) Inventors: Nitin Agarwal, San Diego, CA (US); Girish Khandelwal, San Diego, CA (US); Yongle Wu, San Diego, CA (US); Joe Thomas, San Diego, CA (US); Talha Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

(21) Appl. No.: 18/176,953

(22) Filed: Mar. 1, 2023

(65) Prior Publication Data

US 2024/0298199 A1     Sep. 5, 2024

(51) Int. Cl.
*H04W 24/10*      (2009.01)
*H04L 27/26*      (2006.01)
*H04W 52/24*      (2009.01)

(52) U.S. Cl.
CPC ......... *H04W 24/10* (2013.01); *H04L 27/2657* (2013.01); *H04W 52/24* (2013.01)

(58) Field of Classification Search
CPC .... H04W 24/10; H04W 52/24; H04L 27/2657
See application file for complete search history.

(56) References Cited

U.S. PATENT DOCUMENTS

| 2014/0376517 | A1* | 12/2014 | Geirhofer | H04L 1/00 370/332 |
| 2017/0142751 | A1* | 5/2017 | Liu | H04L 27/2613 |
| 2018/0054744 | A1* | 2/2018 | Smith | H04B 7/0695 |
| 2019/0028168 | A1* | 1/2019 | Vermani | H04B 7/0617 |
| 2020/0112978 | A1* | 4/2020 | Zhang | H04W 72/21 |
| 2021/0037529 | A1* | 2/2021 | Park | H04L 5/0053 |
| 2022/0022144 | A1* | 1/2022 | Zhu | H04W 24/10 |
| 2022/0191863 | A1* | 6/2022 | Miao | H04L 5/0053 |
| 2022/0224461 | A1* | 7/2022 | Lee | H04B 7/0404 |
| 2025/0048261 | A1* | 2/2025 | Nader | H04W 52/0216 |

* cited by examiner

*Primary Examiner* — Melanie Jagannathan
(74) *Attorney, Agent, or Firm* — Holland & Hart LLP/ QUALCOMM Incorporated

(57) ABSTRACT

Methods, systems, and devices for wireless communications are described. A wireless device may receive a control signal that indicates a radio resource management (RRM) configuration associated with one or more measurement thresholds for managing wireless communication links at the wireless device. The wireless device may then perform measurements for one or more synchronization signals in accordance with the RRM configuration. The wireless device may then apply an opportunistic gain to the measurements to generate modified measurements based on a quantity of radio frequency (RF) chains usable by the wireless device for communicating via the wireless communication links. The wireless device may then transmit a measurement report based on the modified measurements satisfying the one or more measurement thresholds, and may receive an additional control signal instructing the wireless device to manage the wireless communication links based on the measurement report.

30 Claims, 12 Drawing Sheets

OPPORTUNISTIC REPORTING TECHNIQUES FOR DEVICES HAVING INCREASED QUANTITIES OF RECEPTION CHAINS

INTRODUCTION

The following relates to wireless communications, including techniques for managing measurement gain.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

A method for wireless communication at a wireless device is described. The method may include receiving a control signal that indicates a radio resource management (RRM) configuration associated with one or more measurement thresholds for managing one or more wireless communication links at the wireless device, receiving one or more synchronization signals, performing one or more measurements for the one or more synchronization signals in accordance with the RRM configuration, generating one or more modified measurements based on applying an opportunistic gain to the one or more measurements, where the opportunistic gain is based on a quantity of radio frequency chains usable for communicating via the one or more wireless communication links at the wireless device, transmitting a measurement report based on the one or more modified measurements satisfying the one or more measurement thresholds, and receiving an additional control signal instructing the wireless device to manage the one or more wireless communication links based on the measurement report.

An apparatus for wireless communication at a wireless device is described. The apparatus may include a processor, memory coupled with the processor, and instructions stored in the memory. The instructions may be executable by the processor to cause the apparatus to receive a control signal that indicates a RRM configuration associated with one or more measurement thresholds for managing one or more wireless communication links at the wireless device, receive one or more synchronization signals, perform one or more measurements for the one or more synchronization signals in accordance with the RRM configuration, generate one or more modified measurements based on applying an opportunistic gain to the one or more measurements, where the opportunistic gain is based on a quantity of radio frequency chains usable for communicating via the one or more wireless communication links at the wireless device, transmit a measurement report based on the one or more modified measurements satisfying the one or more measurement thresholds, and receive an additional control signal instructing the wireless device to manage the one or more wireless communication links based on the measurement report.

Another apparatus for wireless communication at a wireless device is described. The apparatus may include means for receiving a control signal that indicates a RRM configuration associated with one or more measurement thresholds for managing one or more wireless communication links at the wireless device, means for receiving one or more synchronization signals, means for performing one or more measurements for the one or more synchronization signals in accordance with the RRM configuration, means for generating one or more modified measurements based on applying an opportunistic gain to the one or more measurements, where the opportunistic gain is based on a quantity of radio frequency chains usable for communicating via the one or more wireless communication links at the wireless device, means for transmitting a measurement report based on the one or more modified measurements satisfying the one or more measurement thresholds, and means for receiving an additional control signal instructing the wireless device to manage the one or more wireless communication links based on the measurement report.

A non-transitory computer-readable medium storing code for wireless communication at a wireless device is described. The code may include instructions executable by a processor to receive a control signal that indicates a RRM configuration associated with one or more measurement thresholds for managing one or more wireless communication links at the wireless device, receive one or more synchronization signals, perform one or more measurements for the one or more synchronization signals in accordance with the RRM configuration, generate one or more modified measurements based on applying an opportunistic gain to the one or more measurements, where the opportunistic gain is based on a quantity of radio frequency chains usable for communicating via the one or more wireless communication links at the wireless device, transmit a measurement report based on the one or more modified measurements satisfying the one or more measurement thresholds, and receive an additional control signal instructing the wireless device to manage the one or more wireless communication links based on the measurement report.

Some examples of the method, apparatuses, and non-transitory computer-readable medium described herein may further include operations, features, means, or instructions for determining whether to apply the opportunistic gain based on a power headroom (PHR) metric, a pathloss metric, or both, satisfying one or more thresholds, where the PHR metric, the pathloss metric, or both, may be based on the one or more measurements.

In some examples of the method, apparatuses, and non-transitory computer-readable medium described herein, the one or more synchronization signals may be received via a first serving cell and a second serving cell and the method, apparatuses, and non-transitory computer-readable medium may include further operations, features, means, or instructions for determining the opportunistic gain based on the first serving cell being associated with a first radio access technology (RAT) and the second serving cell being associated with a second RAT different from the first RAT.

In some examples of the method, apparatuses, and non-transitory computer-readable medium described herein, the wireless device includes an antenna panel associated with the quantity of radio frequency chains and the method, apparatuses, and non-transitory computer-readable medium may include further operations, features, means, or instructions for determining the opportunistic gain based on an antenna configuration including one or more parameters associated with the antenna panel.

In some examples of the method, apparatuses, and non-transitory computer-readable medium described herein, the one or more parameters associated with the antenna panel include a placement of antenna elements within the antenna panel, an antenna form factor of the antenna panel, or both.

Some examples of the method, apparatuses, and non-transitory computer-readable medium described herein may further include operations, features, means, or instructions for performing one or more measurement procedures to generate measurement data based on the one or more measurements and the quantity of radio frequency chains, where the opportunistic gain may be based on the measurement data.

Some examples of the method, apparatuses, and non-transitory computer-readable medium described herein may further include operations, features, means, or instructions for determining the opportunistic gain based on a frequency band associated with the one or more synchronization signals communicated with a RAT associated with the one or more wireless communication links.

Some examples of the method, apparatuses, and non-transitory computer-readable medium described herein may further include operations, features, means, or instructions for determining the opportunistic gain based on a duplexing configuration associated with communications performed via the one or more wireless communication links, the duplexing configuration including a frequency division duplexing (FDD) configuration, a time division duplexing (TDD) configuration, or both.

Some examples of the method, apparatuses, and non-transitory computer-readable medium described herein may further include operations, features, means, or instructions for determining the opportunistic gain based on a battery level associated with the wireless device being greater than or equal to a threshold battery level.

In some examples of the method, apparatuses, and non-transitory computer-readable medium described herein, the one or more synchronization signals may be received via a serving cell and the method, apparatuses, and non-transitory computer-readable medium may include further operations, features, means, or instructions for determining the opportunistic gain based on a quantity of failed random access channel (RACH) attempts associated with the serving cell.

In some examples of the method, apparatuses, and non-transitory computer-readable medium described herein, the one or more measurement thresholds of the RRM configuration include a first threshold for performing a handover procedure associated with the one or more wireless communication links, a second threshold for performing a cell addition procedure associated the one or more wireless communication links, a third threshold for performing a cell drop procedure associated with the one or more wireless communication links, or any combination thereof and the additional control signal indicates for the wireless device to perform the handover procedure, perform the cell addition procedure, perform the cell drop procedure, or any combination thereof.

In some examples of the method, apparatuses, and non-transitory computer-readable medium described herein, the one or more measurement thresholds of the RRM configuration include a dual connectivity threshold, a secondary component carrier addition threshold, a secondary component carrier drop threshold, or any combination thereof and the additional control signal indicates for the wireless device to add a serving cell for dual connectivity operation, add a secondary component carrier, drop an additional secondary component carrier, or any combination thereof.

In some examples of the method, apparatuses, and non-transitory computer-readable medium described herein, performing the one or more measurements may include operations, features, means, or instructions for performing, for the one or more synchronization signals, one or more reference signal received power measurements, one or more signal-to-noise ratio (SNR) measurements, one or more channel quality indicator (CQI) measurements, or any combination thereof.

In some examples of the method, apparatuses, and non-transitory computer-readable medium described herein, the wireless device includes a customer premises equipment (CPE), a UE, or both.

DETAILED DESCRIPTION

Figure 1:
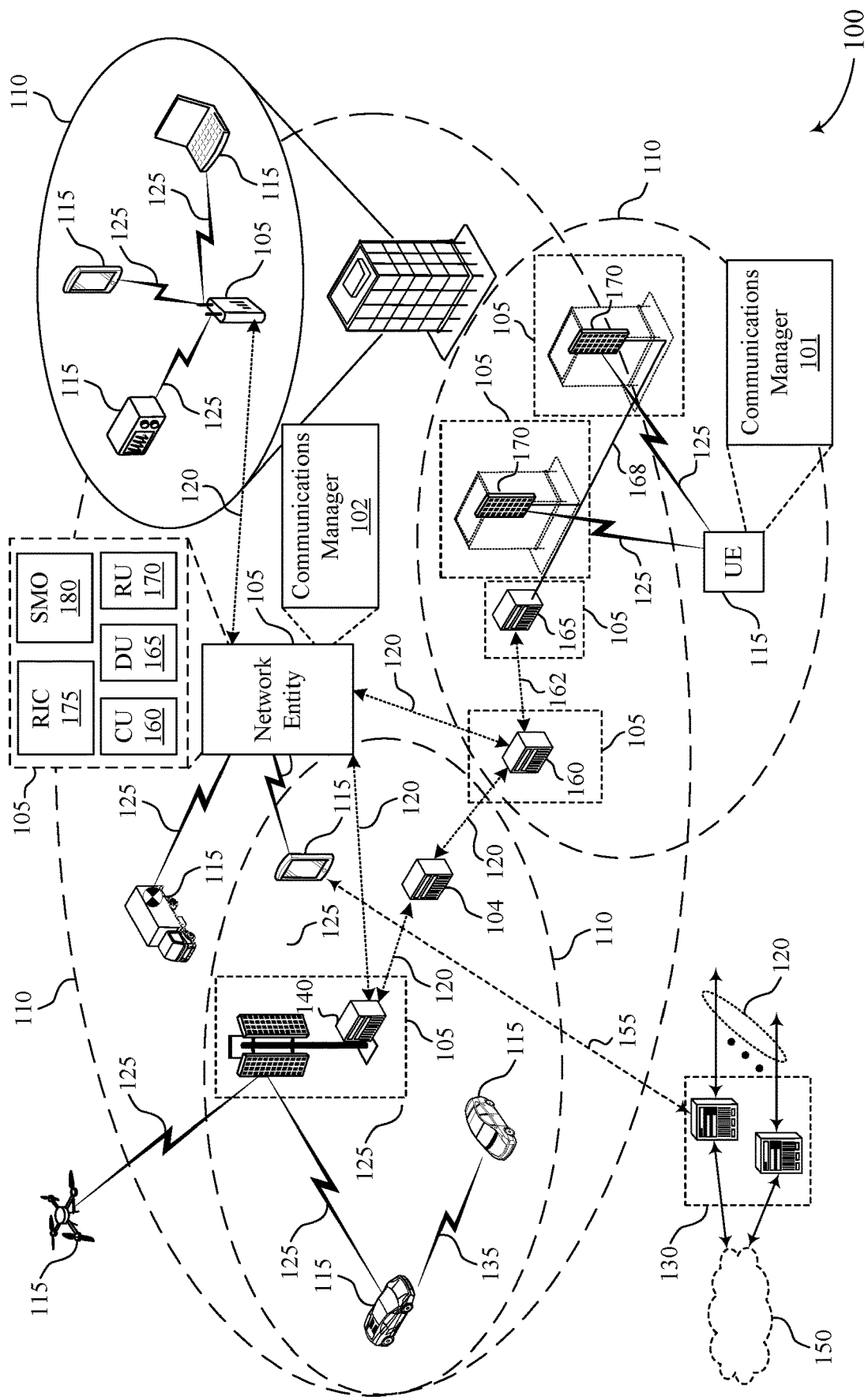
FIG. 1 illustrates an example of a wireless communications system that supports opportunistic reporting techniques for devices having increased quantities of reception/receive chains (Rx chains) in accordance with one or more aspects of the present disclosure.

Some wireless networks may configure wireless devices (e.g., UEs) with certain thresholds or conditions for performing various actions, such as performing handover procedures, adding or dropping a serving cell, and the like. For example, a UE may be configured with trigger conditions that cause the UE to switch from a first serving cell to a second serving cell when a relative quality of one or more signals received from the first cell drops below a first threshold, and/or when a relative quality of one or more signals received from the second cell is above a second threshold, which may be different than the first threshold.

In some aspects, different wireless devices may be configured with different quantities of Rx chains that may improve diversity gains and quality of communications. That is, UEs with 8 Rx chains may achieve higher signal qualities compared to UEs with 4 Rx chains. However, in some cases, networks (e.g., network entities) do not take capabilities related to Rx chains of individual UEs into account when configuring thresholds or conditions for performing handover procedures, or for adding or dropping cells. That is, UEs may be configured with the same thresholds or the same/conditions for performing certain operations (e.g., handover or cell addition or droppage) regardless of the quantity of Rx chains at the respective UEs. As such, by configuring all UEs with the same thresholds conditions, UEs with larger quantities of Rx chains may be unable to take advantage of the diversity gains that may be achieved using the additional Rx chains.

Accordingly, aspects of the present disclosure are directed to techniques that enable wireless devices to opportunistically adjust measurement reports transmitted to the network or a network entity based on relative quantities of Rx chains at the respective wireless devices. For example, aspects of the present disclosure are directed to mechanisms that enable a wireless device to adjust measurements (e.g., apply a gain to measurements) that are reported to the network for performing handover, or for adding or dropping cells, where the adjustments are made based on the quantity of Rx chains (and therefore potential diversity gain) at the wireless device.

For example, a UE may be configured with measurement thresholds that are used for RRM (e.g., measurement threshold for triggering handovers, cell addition). The UE may perform measurements, and may apply some opportunistic gain metric to the performed measurements to obtain modified measurements, where the opportunistic gain metric is a measure of (or corresponds to) potential gain that may be realized by the UE based on the quantity of Rx chains usable or supported by the UE for wireless communications. The UE may then transmit a measurement report to the network based on the modified measurements satisfying or failing to satisfy one or more configured thresholds at the UE. The network may use the measurement report to trigger RRM decisions for the UE, such as trigger a handover procedure, add a cell, drop a cell (e.g., a serving cell) at the UE, etc. By applying the opportunistic gain metric, a UE may be able to take advantage of diversity gain offered by increased quantities of Rx chains. For instance, the opportunistic gain metric may enable the UE to delay dropping an NR cell and switching to an LTE cell (e.g., drop an NR cell from an evolved universal mobile telecommunication system terrestrial radio access (E-UTRA) dual connectivity (EN-DC) architecture and switch to a standalone LTE cell), or switch from an LTE cell to an NR cell (e.g., switch from a standalone LTE cell to an EN-DC architecture with LTE and NR cells) earlier than UEs with fewer Rx chains.

Aspects of the disclosure are initially described in the context of wireless communications systems. Additional aspects of the present disclosure are described in the context of an example network architecture and an example process flow. Aspects of the disclosure are further illustrated by and described with reference to apparatus diagrams, system diagrams, and flowcharts that relate to opportunistic reporting techniques for devices having increased quantities of Rx chains.

FIG. 1 illustrates an example of a wireless communications system 100 that supports opportunistic reporting techniques for devices having increased quantities of Rx chains in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network (e.g., 5G-Advanced network), a sixth generation (6G) network, or a network operating in accordance with other systems and radio technologies using a UE communications manager 101, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices using a UE communications manager 101, such as other UEs 115 or network entities 105, as shown in FIG. 1.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a second one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some examples, network entities 105 may communicate with the core network 130, or with one another, or both, using a communications manager 102. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support opportunistic reporting techniques for devices having increased quantities of Rx chains as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both FDD and TDD component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In some examples, such as in a carrier aggregation configuration, a carrier may also have acquisition signaling or control signaling that coordinates operations for other carriers. A carrier may be associated with a frequency channel (e.g., an E-UTRA absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest SNR, highest signal-to-interference-plus-noise ratio (SINR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Wireless communications system 100 may support techniques that enable wireless devices to opportunistically adjust measurement reports transmitted by a wireless device, such as a UE 115, to the network, such as a network entity 105, based on relative quantities of Rx chains at the respective wireless devices. In particular, the wireless communications system 100 may support mechanisms that enable a wireless device to artificially adjust measurements that are reported to the network for performing handovers and/or adding/dropping cells based on the quantity of Rx chains (and therefore potential diversity gain) at the wireless device.

For example, a UE 115 of the wireless communications system 100 may be configured with measurement thresholds that are used for RRM (e.g., measurement threshold for triggering handovers, cell addition, etc.). The UE 115 may perform measurements, and apply some opportunistic gain metric to the performed measurements, where the opportunistic gain metric is a measure of potential gain that may be realized by the UE 115 based on the quantity of Rx chains usable by the UE 115. The UE 115 may then transmit a measurement report to the network based on the modified measurements satisfying the configured thresholds, where the network may then use the measurement report to trigger RRM decisions for the UE 115, such as trigger a handover procedure, add/drop a serving cell at the UE, etc.

Techniques described herein may enable wireless devices to take advantage of diversity gain offered by increased quantities of Rx chains by applying opportunistic gains to measurements performed by the respective devices. In this regard, aspects of the present disclosure may enable wireless devices to apply an opportunistic gain for RRM procedures, which may enable the wireless devices to delay dropping an NR cell and switching to an LTE cell, or switch from an LTE cell to an NR cell earlier than would be possible for UEs with fewer Rx chains. Accordingly, aspects of the present disclosure may enable wireless devices to perform RRM procedures (e.g., cell handovers, cell additions/drops, etc.) in such a manner as to improve throughput at the respective devices, as well as improve an overall efficiency and reliability of wireless communications.

Figure 2:
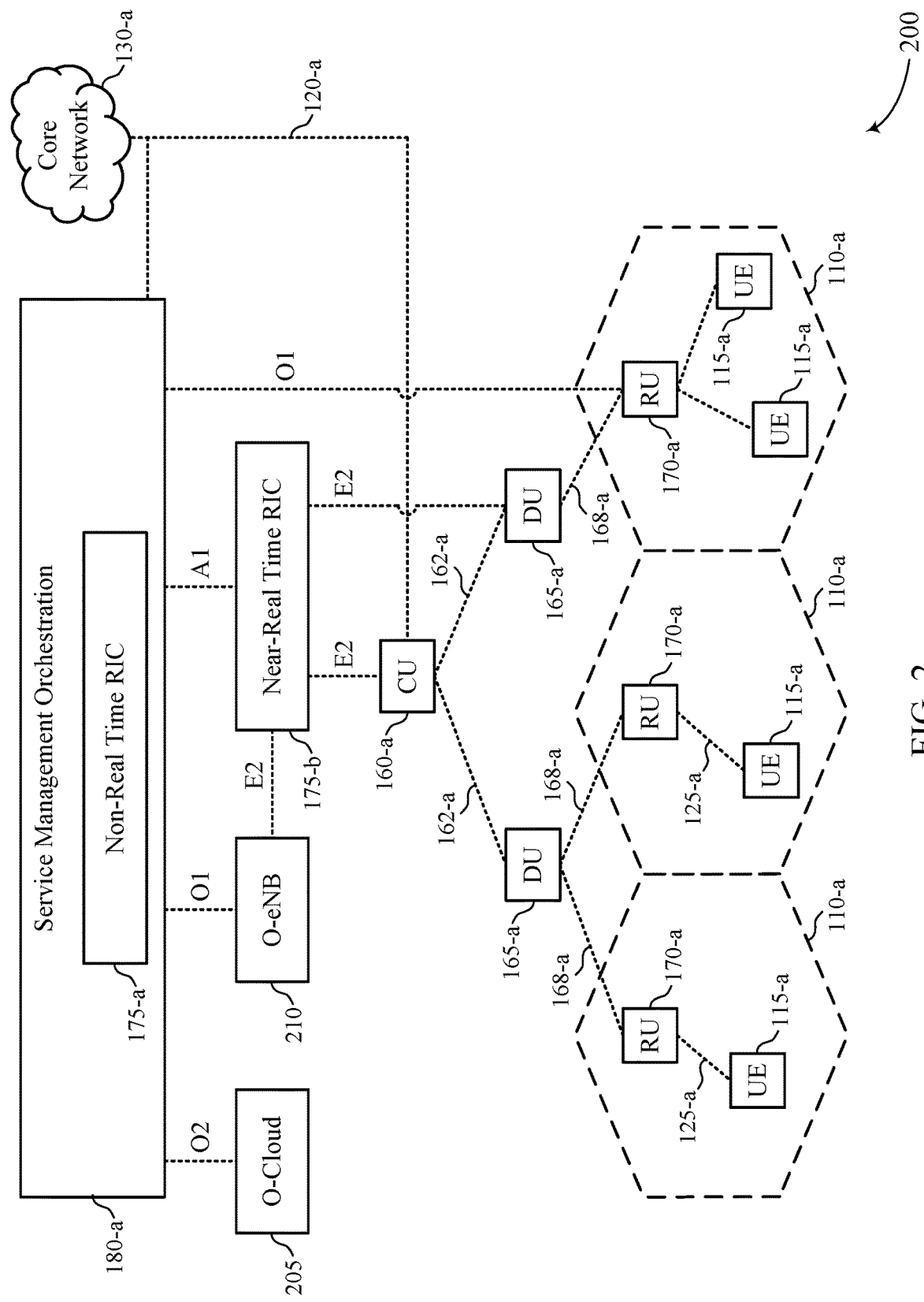
FIG. 2 illustrates an example of a network architecture that supports opportunistic reporting techniques for devices having increased quantities of Rx chains in accordance with one or more aspects of the present disclosure.

FIG. 2 illustrates an example of a network architecture 200 (e.g., a disaggregated base station architecture, a disaggregated RAN architecture) that supports opportunistic reporting techniques for devices having increased quantities of Rx chains in accordance with one or more aspects of the present disclosure. The network architecture 200 may illustrate an example for implementing one or more aspects of the wireless communications system 100. The network architecture 200 may include one or more CUs 160-a that may communicate directly with a core network 130-a via a backhaul communication link 120-a, or indirectly with the core network 130-a through one or more disaggregated network entities 105 (e.g., a Near-RT RIC 175-b via an E2 link, or a Non-RT RIC 175-a associated with an SMO 180-a (e.g., an SMO Framework), or both). A CU 160-a may communicate with one or more DUs 165-a via respective midhaul communication links 162-a (e.g., an F1 interface). The DUs 165-a may communicate with one or more RUs 170-a via respective fronthaul communication links 168-a. The RUs 170-a may be associated with respective coverage areas 110-a and may communicate with UEs 115-a via one or more communication links 125-a. In some implementations, a UE 115-a may be simultaneously served by multiple RUs 170-a.

Each of the network entities 105 of the network architecture 200 (e.g., CUs 160-a, DUs 165-a, RUs 170-a, Non-RT RICs 175-a, Near-RT RICs 175-b, SMOs 180-a, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-a may host one or more higher layer control functions. Such control functions may include RRC, PDCP, SDAP, or the like. Each control function may be implemented with an interface configured to communicate signals with other control functions hosted by the CU 160-a. A CU 160-a may be configured to handle user plane functionality (e.g., CU-UP), control plane functionality (e.g., CU-CP), or a combination thereof. In some examples, a CU 160-a may be logically split into one or more CU-UP units and one or more CU-CP units. A CU-UP unit may communicate bidirectionally with the CU-CP unit via an interface, such as an E1 interface when implemented in an O-RAN configuration. A CU 160-a may be implemented to communicate with a DU 165-a, as necessary, for network control and signaling.

A DU 165-a may correspond to a logical unit that includes one or more functions (e.g., base station functions, RAN functions) to control the operation of one or more RUs 170-a. In some examples, a DU 165-a may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-a may further host one or more low PHY layers. Each layer may be implemented with an interface configured to communicate signals with other layers hosted by the DU 165-a, or with control functions hosted by a CU 160-a.

In some examples, lower-layer functionality may be implemented by one or more RUs 170-a. For example, an RU 170-a, controlled by a DU 165-a, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-a may be implemented to handle over the air (OTA) communication with one or more UEs 115-a. In some implementations, real-time and non-real-time aspects of control and user plane communication with the RU(s) 170-a may be controlled by the corresponding DU 165-a. In some examples, such a configuration may enable a DU 165-a and a CU 160-a to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Network architecture 200 may support techniques that enable wireless devices to opportunistically adjust measurements included in measurement reports transmitted by a wireless device, such as a UE 115-*a*, to one or more components of a network entity 105, such as an RU 170-*a*, a DU 165-*a*, or a CU 160-*a*. The adjusted measurements may be based on relative quantities of Rx chains at the respective wireless devices. For example, the network architecture 200 may support mechanisms that enable a UE 115 to artificially adjust measurements that are included in a measurement report for performing handovers, or adding or dropping cells based on the quantity of Rx chains (and therefore potential diversity gain) at the wireless device.

For example, a UE 115 of the network architecture 200 may be configured with measurement thresholds that are used for RRM (e.g., measurement threshold for triggering handovers, cell addition, etc.). The UE 115 may perform measurements (e.g. of one or more signals transmitted from a component of the network entity 105 (such as an RU 170-*a*, a DU 165-*a*, or a CU 160-*a*), and apply some opportunistic gain metric to the performed measurements. In some cases, the opportunistic gain metric may be a measure of potential gain that may be realized by the UE 115 based on the quantity of Rx chains usable or supported by the UE 115 for wireless communications. The UE 115 may then transmit a measurement report (e.g., to one or more components of the network 105) based on the modified measurements satisfying the configured thresholds, which may be used by the network to make or trigger RRM decisions for the UE 115, such as trigger a handover procedure, or add or drop a serving cell at the UE 115, etc.

Figure 3:
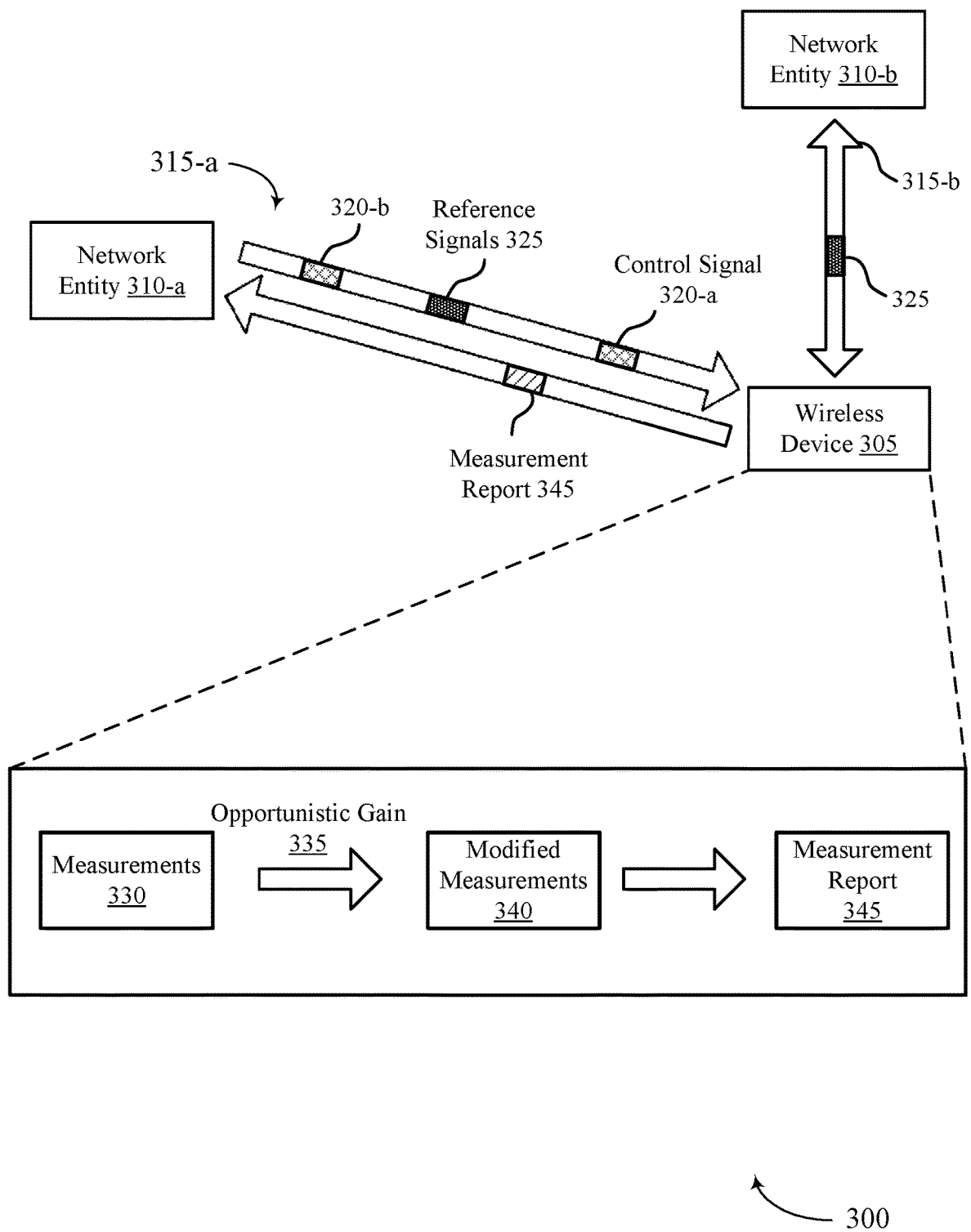
FIG. 3 illustrates an example of a wireless communications system that supports opportunistic reporting techniques for devices having increased quantities of Rx chains in accordance with one or more aspects of the present disclosure.

FIG. 3 illustrates an example of a wireless communications system 300 that supports opportunistic reporting techniques for devices having increased quantities of Rx chains in accordance with one or more aspects of the present disclosure. Aspects of the wireless communications system 300 may implement, or be implemented by, aspects of wireless communications system 100, the network architecture 200, or both. For example, the wireless communications system 300 may support techniques that enable a wireless device 305 to apply an opportunistic gain based on a quantity of Rx chains at the Rx device, as described previously herein.

The wireless communications system 300 may include a wireless device 305, a first network entity 310-*a*, and a second network entity 310-*b*, which may be examples of UEs 115, network entities 105, and other wireless devices as described with reference to FIGS. 1-2. For example, the wireless device 305 may include, but is not limited to, a UE 115, an IAB node, a CPE, or any combination thereof. In some aspects, the first network entity 310-*a* and the second network entity 310-*b* may include separate devices or entities (e.g., separate TRPs). In additional or alternative implementations, the first network entity 310-*a* and the second network entity 310-*b* may include or be associated with (e.g., supported by) the same device or entity. For example, in some cases, the respective network entities 310 may include serving cells (e.g., primary cells (PCells), secondary cells (SCells), primary-secondary cells (PSCells)) supported by one or more devices or entities.

In some aspects, the wireless device 305 may communicate with the network entities 310-*a*, 310-*b* via communication links 315-*a* and 315-*b*. In some cases, the communication links 315 may include examples of access links (e.g., Uu links). The communication links 315 may include bi-directional links that can include both uplink and downlink communication. For example, the wireless device 305 may transmit uplink transmissions, such as uplink control signals or uplink data signals, to the network entity 310-*a* using the communication link 315-*a*, and the network entity 310-*a* may transmit downlink transmissions, such as downlink control signals or downlink data signals, to the wireless device 305 using the communication link 315-*a*.

As noted previously herein, different wireless devices may be configured with different quantities of Rx chains that may result in improved diversity gains and improved quality of communications. That is, UEs 115 with 8 Rx chains may achieve higher signal qualities compared to UEs 115 with 4 Rx chains. However, some networks do not take capabilities of individual devices into account when configuring thresholds or conditions for performing handover procedures or adding/dropping cells (e.g., NR cell addition/removal). In other words, UEs may be configured with the same thresholds/conditions for performing certain actions regardless of the number of applicable Rx chains at the respective UEs 115.

For example, consider a first UE 115 with two Rx (2Rx) chains, and a second UE 115 with eight Rx (8Rx) chains. At a cell edge, the 8Rx UE 115 may be able to achieve a demodulation performance that roughly 6 dB better than the performance of the 2Rx UE 115. As a result, the 8Rx UE 115 may be able to perform PCell addition at a threshold that is 6 dB lower as compared to PCell addition that is able to be performed at the 2Rx UE 115. However, as noted previously herein, the network may not distinguish between UE 115 types or quantities of Rx chains, and may configure both the 8Rx and the 2Rx UEs 115 with the same RRM thresholds for performing cell additions, removals, handovers, etc. (e.g., thresholds such as event B1 to add PSCell and event A2 to release the PSCell). As a result, by configuring all UEs 115 with the same thresholds/conditions, UEs 115 with larger numbers of Rx chains, may be unable to take advantage of the diversity gains that may be achieved using the additional Rx chains.

Relevant thresholds associated with communication link management procedures (e.g., cell addition/drop, EN-DC addition) that may be affected by RRM configurations are shown in Table 1 below:

cell based on event trigger A2 (as compared to the 2Rx device) based on the increased quantity of Rx chains and improved diversity gains.

As such, in some wireless networks, situations may arise where wireless devices with increased quantities of Rx chains may communicate with sub-optimal Rx configurations (e.g., sub-optimal serving cells, sub-optimal RATs). In such cases, RRM configurations may not enable the wireless devices to trigger measurement reporting and communication link management procedures by considering the diversity and/or nominal gain associated with additional Rx chains at the wireless devices, while also evaluating and accounting for relevant thresholds for reporting criteria.

Accordingly, aspects of the present disclosure are directed to techniques that enable wireless devices to opportunistically adjust measurement reports transmitted to the network based on relative quantities of Rx chains at the respective wireless devices. In particular, aspects of the present disclosure are directed to mechanisms that enable a wireless device to artificially adjust measurements that are reported to the network for performing handovers and/or adding/dropping cells based on the quantity of Rx chains (and therefore potential diversity gain) at the wireless device.

In this regard, aspects of the present disclosure may enable wireless devices to apply an opportunistic gain to

TABLE 1

| RRM Event Triggers | | | | |
|---|---|---|---|---|
| Call Flow | Example 1 | Example 2 | Example 3 | Example 4 |
| EN-DC Addition | Event B1 and threshold configured by NW B1 threshold = −130 dBm | Event B1 and threshold configured by NW B1 threshold = −100 dBm | Event B1 and threshold configured by NW B1 Threshold = −98 dBm | Event B1 and threshold configured by NW B1 Threshold = −105 dBm |
| SCC Addition (CA) | For infra-vendor, SCC addition is blind, they have defined A1 of SCC for SCC activation Event A1 for SCC activation A1 threshold = −100 dBm | Event A1 of PCC (Serving becomes better than Threshold) A1 threshold = −90 dBm | Event A4 (Neighbor better than Threshold) A1 threshold = −86 dBm | Event A5 (PCell worse than Th1 and neighbor better than Th2) A5 threshold1 = −30 dBm, A5 threshold2 = −105 dBm |
| SCC Release | There is no measurement based SCC release mechanism for infra vendor | Event A2 of SCC | Event A2 of SCC | HW doesn't have measurement based SCC release |

Continuing with the example above including the 2Rx UE 115 and the 8Rx UE 115 in the far cell edge scenario, without any biasing, the respective devices may perform measurements at the cell edge with approximately the same measurements (e.g., same RSRP), and may trigger events illustrated in Table 1 at approximately the same time. However, due to the increased quantity of Rx chains, the 8Rx device could have measured NR cells with better RSRP. As a result, the 8Rx device could have therefore met the event threshold B1 from Table 1 above in the cell edge scenarios. Moreover, due to the improved RSRP measurements, the 8Rx device could have delayed removal of NR effectively and efficiently trigger communication link management procedures (e.g., cell addition/drop, etc.), such as the communication link procedures outlined in Table 1 above. Specifically, techniques described herein may enable wireless devices to apply opportunistic gains to improve performance aspects such as throughput, spectral efficiency, and increased NR utilization (such as by optimizing NR cell addition and reduction in NR cell removal)

For example, referring to the wireless communications system 300 illustrated in FIG. 3, the wireless device 305 may receive a control signal 320-a (e.g., RRC, downlink control information (DCI), MAC-CE) that indicates an RRM configuration associated with one or more measurement thresholds for managing one or more wireless communication links at the wireless device 305 (e.g., wireless links between the wireless device 505 and the first network entity 510-*a*, the second network entity 510-*b*, additional wireless devices, or any combination thereof).

The control signal 320-*a* may indicate one or more thresholds from Table 1 above for managing wireless communication links at the wireless device 305. In this regard, the control signal 320-*a* may be configured with thresholds used for triggering events for managing communication links, such as thresholds for triggering cell addition, cell drop, cell handover, SCell addition, and the like. For example, the one or more thresholds may include thresholds for performing a handover procedure, a cell addition procedure (e.g., secondary component carrier addition), a cell drop procedure (e.g., secondary component carrier drop), and the like. Additionally, or alternatively, the one or more thresholds may include a threshold for triggering or dropping dual connectivity (e.g., dual connectivity threshold, EN-DC threshold).

In some aspects, the wireless device 305 may receive one or more reference signals 325 (e.g., synchronization signals) from the first network entity 310-*a*, the second network entity 310-*b*, or both. For example, in some cases, the wireless device 305 may receive synchronization signals (or some other reference signals 325) from both the network entities 310 in order to evaluate whether to perform a handover from the first network entity 310-*a* to the second network entity 310-*b*, to evaluate whether to add the second network entity 310-*b* and/or drop the first network entity 310-*a*, or any combination thereof.

The wireless device 305 may perform one or more measurements 330 for the reference signals 325 (e.g., synchronization signals) received from the respective network entities 510. The measurements 330 may include, but are not limited to, reference signal received power (RSRP) measurements, reference signal received quality (RSRQ) measurements, SNR measurements, SINR measurements, CQI measurements, or any combination thereof. In particular, the wireless device 305 may perform the measurements 330 in accordance with the RRM configuration received via the control signal 320-*a*. In other words, the wireless device 305 may perform measurements 330 in order to evaluate applicable thresholds that are used to trigger events used to manage communication links at the wireless device 305.

In some aspects, the wireless device 305 may determine whether or not to apply an opportunistic gain 335 to the measurements 330. In some aspects, the opportunistic gain 335 may be based on a quantity of RF chains (e.g., Rx chains) usable for performing communications at the wireless device 305. The opportunistic gain 335 (e.g., nominal gain, diversity gain) may be measured or applied in terms of dB, where the opportunistic gain 335 indicates or represents a nominal gain expected beyond a certain RF metric (e.g., ≤−X dBm RSRP, or Z dB SNR).

As described previously herein, the opportunistic gain 335 may enable the wireless device 305 to increase NR utilization and/or improve coverage extension, particularly in cases where the wireless device 305 is always powered on (e.g., CPE) or where the wireless device 305 has a constant power source (e.g., in cases where battery power is not an issue). In some implementations, the wireless device 305 may determine whether or not to apply the opportunistic gain 335 in order to prioritize performance aspects (e.g., coverage extension) compared to power optimization (mA) with respect to utilization of all Rx chains at the wireless device 305, particularly for far-cell RF conditions.

For example, as described previously herein, the wireless device 305 may be configured to apply an opportunistic gain 335 in order to improve a probability of NR cell addition, and/or to reduce a probability of NR cell removal/mobility. For example, the wireless device 305 may be configured to add or apply a nominal/diversity gain (e.g., opportunistic gain) on top of current cell level RF metrics to be reported to the network in order to improve NR addition probability. Similarly, the wireless device 305 may be configured to add or apply a nominal/diversity gain (e.g., opportunistic gain) on top of current cell level RF metrics (e.g., RSRP) to be reported to the network in order to reduce NR cell removal/mobility (e.g., EN-DC, NR-DC, SA CA).

In some aspects, the wireless device 305 may determine the opportunistic gain 335 (e.g., whether or not to apply the opportunistic gain 335) based on a number of parameters, conditions, or factors. Parameters or factors that may be used to determine the opportunistic gain 335 may include, but are not limited to, a defined percentile (e.g., the opportunistic gain 335 is some defined percentile relative to the measurements 330 or some other reference), simulations data (e.g., predictions or measurement procedures made or calculated by the wireless device 305), an antenna configuration associated with an antenna panel(s) at the wireless device 305 (e.g., antenna placement or form factor, such as an original equipment manufacturer (OEM) antenna panel), a frequency of operation (e.g., frequency ranges/bands supported by the respective network entities 310), a duplexing configuration performed by the wireless device 305 (e.g., FDD, TDD), a battery or power level at the wireless device 305, or any combination thereof.

Additionally, or alternatively, the wireless device 305 may determine the opportunistic gain 335 (e.g., whether or not to apply the opportunistic gain 335) based on computations associated with uplink communications performed at the wireless device 305. For example, the wireless device 305 may determine whether or not to apply the opportunistic gain 335 may be based on a PHR metric and/or pathloss metric associated with uplink communications performed by the wireless device 305. In this example, the wireless device 305 may apply the opportunistic gain 335 if the PHR metric and/or the pathloss metric satisfy respective thresholds. Conversely, if the PHR metric and/or pathloss metric do not satisfy the respective thresholds, the wireless device 305 may be configured to fallback to the original calculations without applying the opportunistic gain 335 (e.g., use the original measurements 330) to avoid any link imbalance issue considering diversity gains with respect to the additional Rx chains usable for downlink communications at the wireless device 305.

In additional or alternative implementations, the wireless device 305 may determine the opportunistic gain 335 (e.g., whether or not to apply the opportunistic gain 335) based on a quantity of failed RACH attempts performed with the first network entity 310-*a*, the second network entity 310-*b*, or both. For example, PRACH computations in cell edge scenarios may be used to create an internal database (which may be maintained at the wireless device 305) of failed PRACH attempts. The failed PRACH attempts may be associated with corresponding physical cell IDs (PCIs) (e.g., PCI fingerprinting). In this example, the wireless device 305 may be configured to apply additional power by applying an opportunistic gain 335 (in addition to an RRC over-the-air parameter PRACH step size (in dB)) in order to improve PRACH performance in successive attempts based on pathloss predictions.

According to aspects of the present disclosure, the wireless device 305 may be configured to intelligently and strategically apply the opportunistic gain 335 for measurement reporting in order to improve communication performance with respect to NR utilization and coverage extension. Specific advantages of the present disclosure (such as early NR cell addition and/or delayed NR removal) will be further shown and described with reference to FIG. 4.

In cases where the wireless device 305 determines to apply the opportunistic gain 335, the wireless device 305 may apply the opportunistic gain 335 to the measurements 330 performed at 530 in order to generate modified measurements 340. Specifically, the modified measurements 340 (optimized RF-metrics) may be generated by taking the original measurements 330 (original RF-metrics) and adding the opportunistic gain 335, where the opportunistic gain 335 may be measured in terms of dB. For example, the modified measurements 340 may be determined as follows: Optimized RF-metric RSRP' (opportunistic bias)=Original RF-metric RSRP+nominal_gain (xdB).

Subsequently, the wireless device 305 may evaluate whether the modified measurements 340 (e.g., measurements 330 adjusted by the opportunistic gain 335) satisfy the one or more measurement thresholds associated with the RRM configuration indicated via the control signal 320-a. In other words, the wireless device 305 may determine whether or not the modified measurements 340 satisfy one or more thresholds for transmitting a measurement report 345 that may be used to trigger procedures for managing communication links at the wireless device, such as a cell addition/drop procedure, a handover procedure, and the like.

Moreover, the wireless device 305 may additionally or alternatively be configured to determine whether the original measurements 330 satisfy the respective thresholds used to trigger measurement reports 345. However, as described herein, the application of the opportunistic gain 335 may enable the wireless device 305 to satisfy (or fail to satisfy) certain thresholds earlier or later based on the increased capabilities of the wireless device 305 attributable to the increased quantity of Rx chains. As such, aspects of the present disclosure may be implemented by software at the wireless device 305 to improve operation and management of communication links at the wireless device 305.

In some aspects, the wireless device 305 may transmit a measurement report 345 to the first network entity 310-a. In particular, the wireless device 305 may transmit the measurement report 345 based on determining that the modified measurements 340 satisfy the one or more measurement thresholds. In some aspects, the measurement report 345 may indicate the one or more modified measurements 340, the original measurements 330, or both. In this regard, the measurement report 345 may be generated based on performing the measurements 330 and applying the opportunistic gain 335. In some cases, the measurement report 345 may include indications or requests for the wireless device 305 to perform one or more procedures for managing wireless communication links at the wireless device 305 (e.g., request or indication to perform a cell handover procedure, a cell addition/drop procedure, etc.).

The wireless device 305 may receive, from the first network entity 310-a, an additional control signal 320-b that instructs the wireless device 305 to manage one or more wireless communication links at the 305. In other words, the control signal 320-b may instruct the wireless device 305 to perform a cell handover procedure, a cell addition procedure, a cell drop procedure, to add/drop a secondary component carrier, to add a cell for dual connectivity, or any combination thereof. In some aspects, the first network entity 310-a may transmit the additional control signal 320-b based on the measurement report 345.

For example, the additional control signal 320-b may indicate for the wireless device 305 to perform a handover procedure from the first network entity 310-a to the second network entity 310-b. By way of another example, the additional control signal 320-b may indicate for the wireless device 305 to add or drop the second network entity 310—as a secondary cell or secondary component carrier.

Subsequently, the wireless device 305 may perform communications with the first network entity 310-a, the second network entity 310-b, or both, in accordance with the additional control signal 320-b. For example, in cases where the additional control signal 320-b instructs the wireless device 305 to perform a handover procedure, the wireless device 305 may perform communications to perform a handover procedure from the first network entity 310-a to the second network entity 310-b. By way of another example, in cases where the additional control signal 320-b instructs the wireless device 305 to add a secondary cell supported by the second network entity 310-b, the wireless device 305 may perform communications with the second network entity 310-b to perform the secondary cell addition procedure.

Techniques described herein may enable the wireless device 305 to take advantage of diversity gain offered by increased quantities of Rx chains by applying opportunistic gains 335 to measurements 330 performed by the wireless device 305. In this regard, aspects of the present disclosure may enable the wireless device 305 to apply an opportunistic gain 335 for RRM procedures, which may enable the wireless device 305 to delay dropping an NR cell and switching to an LTE cell, or switch from an LTE cell to an NR cell earlier than would be possible for UEs with fewer Rx chains. Accordingly, aspects of the present disclosure may enable the wireless device 305 to perform RRM procedures (e.g., cell handovers, cell additions/drops, etc.) in such a manner as to improve throughput, as well as improve an overall efficiency and reliability of wireless communications.

Figure 4:
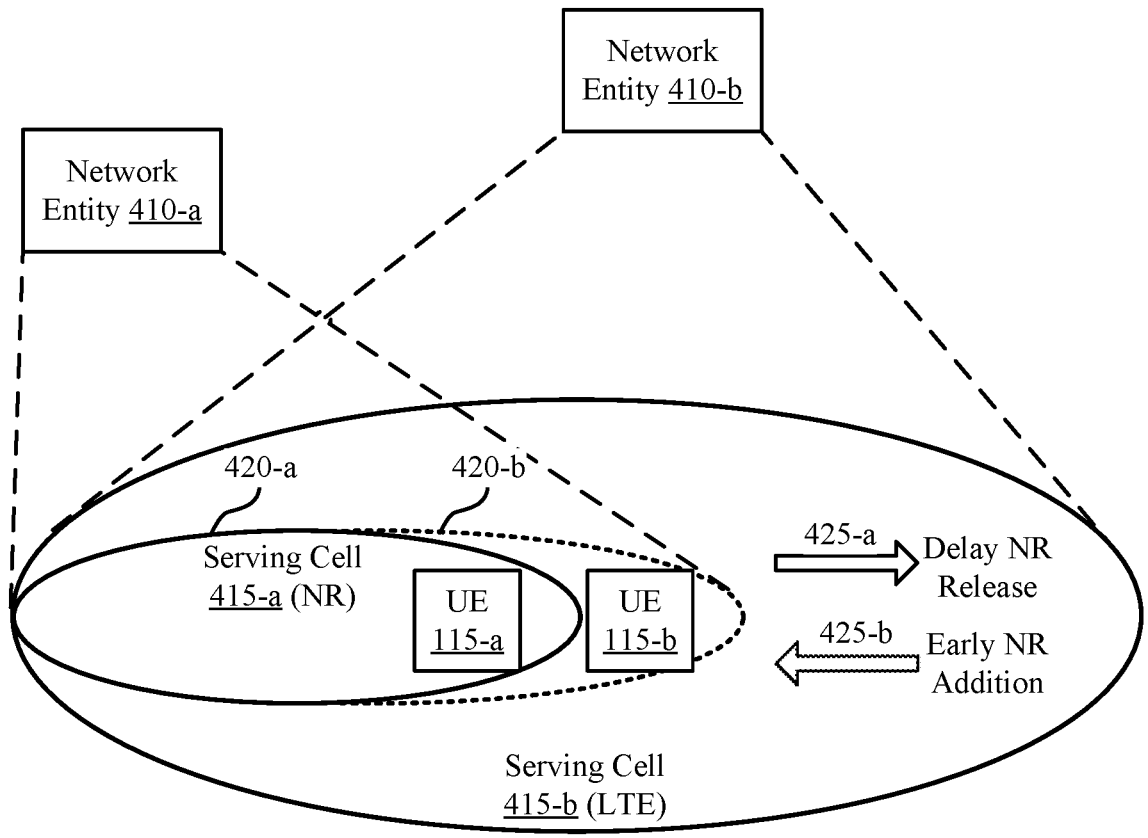
FIG. 4 illustrates an example of a wireless communications system that supports opportunistic reporting techniques for devices having increased quantities of Rx chains in accordance with one or more aspects of the present disclosure.

FIG. 4 illustrates an example of a wireless communications system 400 that supports opportunistic reporting techniques for devices having increased quantities of Rx chains in accordance with one or more aspects of the present disclosure. Aspects of the wireless communications system 400 may implement, or be implemented by, aspects of wireless communications system 100, the network architecture 200, the wireless communications system 300, or any combination thereof.

The wireless communications system 400 includes a first UE 115-a, a second UE 115-b, a first network entity 410-a, and a second network entity 410-b, which may be examples of UEs 115, network entities 105, and other wireless devices as described herein. For example, the first UE 115-a and/or the second UE 115-b illustrated in FIG. 4 may include examples of the wireless device 305 illustrated in FIG. 3. Similarly, the first network entity 410-a and the second network entity 410-b illustrated in FIG. 4 may include examples of the first network entity 310-a and the second network entity 310-b, respectively, as illustrated in FIG. 3.

In some aspects, the first network entity 410-a may support wireless communications with wireless devices (e.g., UEs 115) within a first serving cell 415-a. Similarly, the second network entity 410-b may support wireless communications with wireless devices (e.g., UEs 115) within a second serving cell 415-b. For example, as shown in FIG. 4, the first serving cell 415-*a* may include an NR serving cell, and the second serving cell 415-*b* may include an LTE serving cell.

Moreover, as shown in FIG. 4, the geographical coverage area 420 of the first serving cell 415-*a* may be based on relative capabilities of the respective wireless devices. In other words, the geographical coverage area 420 within which wireless devices (e.g., UEs 115) may access the first serving cell 415-*a* may be based on a quantity of RF/Rx chains of the respective devices. For example, the first serving cell 415-*a* may be accessible within the first coverage area 420-*a* by wireless devices with X quantity of RF/RX chains (e.g., 2Rx or 4Rx devices). Comparatively, the first serving cell 415-*a* may be accessible within the second coverage area 420-*b* by wireless devices with at least Y quantity of RF/RX chains, where Y>X (e.g., 8Rx devices).

In other words, the first serving cell 415-*a* may be accessible within the extended portion of the second coverage area 420-*b* only by wireless devices with increased quantities of RF/Rx chains. In this regard, the first UE 115-*a* illustrated in FIG. 4 may include an example of a wireless device with two or four Rx chains, where the second UE 115-*b* may include an example of a wireless device with eight Rx chains.

In this regard, aspects of the present disclosure may enable the second UE 115-*b* to apply an opportunistic gain to performed measurements to enhance the ability of the second UE 115-*b* to access the NR cell (e.g., first serving cell 415-*a*) in far cell coverage scenarios based on Rx diversity gain without any parameter changes or physical optimization on the part of the network. Stated differently, aspects of the present disclosure may enable the second UE 115-*b* to apply an opportunistic gain to take advantage of diversity gain achieved by increased quantities of Rx chains without increasing RRC signaling overhead at the network. In other words, aspects of the present disclosure may enable the network to configure both the first UE 115-*a* (e.g., 2Rx/4Rx device) and the second UE 115-*b* (e.g., 8Rx device) with the same RRM thresholds, while still enabling the second UE 115-*b* to take advantage of diversity gain achieved by increased quantities of Rx chains.

Aspects of the present disclosure may be implemented within a network to reduce impact on carrier aggregation performance due to reduction in RF re-tuning as a result of component carrier activation/deactivation based on event thresholds. Moreover, fallback mechanisms (via multi-bearer network (MBN), network virtualization (NV)) may enable the UEs 115 to fallback to measurement reporting with no prioritization or opportunistic gain.

Examples may prove to be illustrative. Referring to the wireless communications system 400, the second UE 115-*b* may be moving along direction 425-*a* from left to right across the page. In this example, the second UE 115-*b* may be configured to apply an opportunistic gain to performed measurements in order to delay dropping the NR cell (e.g., first serving cell 415-*a*). As such, techniques described herein may enable the second UE 115-*b* to maintain communications with the first serving cell 415-*a* for a longer duration of time as compared to the first UE 115-*a* (e.g., delay A2 NR release trigger).

By way of another example, the second UE 115-*b* may be moving along direction 425-*b* from right to left across the page. In this example, the second UE 115-*b* may be configured to apply an opportunistic gain to performed measurements in order to perform early addition of the NR cell (e.g., first serving cell 415-*a*). As such, techniques described herein may enable the second UE 115-*b* to establish communications with the first serving cell 415-*a* at an earlier time or point as compared to the first UE 115-*a* (e.g., early B1 NR addition trigger).

Figure 5:
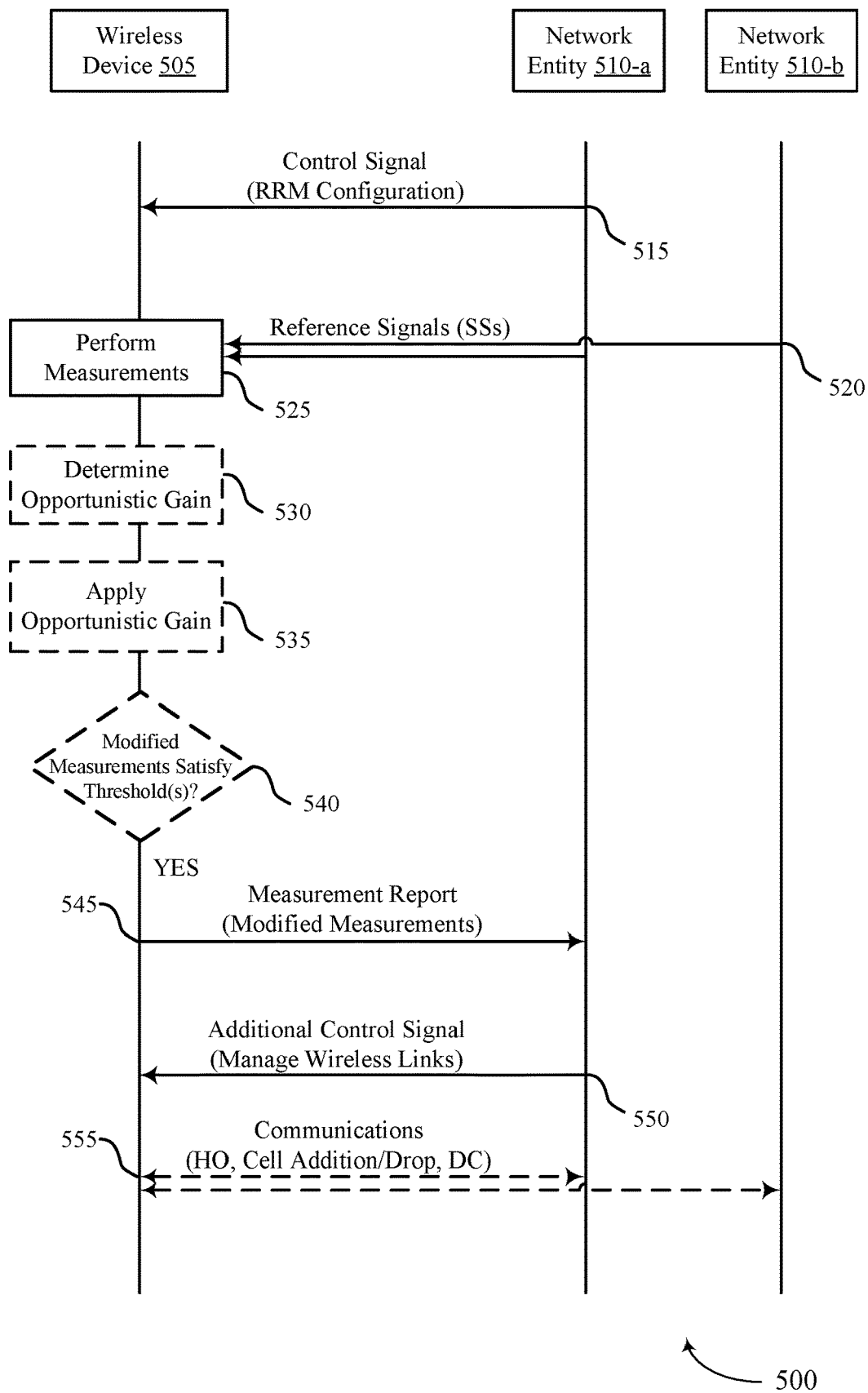
FIG. 5 illustrates an example of a process flow that supports opportunistic reporting techniques for devices having increased quantities of Rx chains in accordance with one or more aspects of the present disclosure.

FIG. 5 illustrates an example of a process flow 500 that supports opportunistic reporting techniques for devices having increased quantities of Rx chains in accordance with one or more aspects of the present disclosure. Aspects of the process flow 500 may implement, or be implemented by, aspects of wireless communications system 100, the network architecture 200, the wireless communications system 300, the wireless communications system 400, or any combination thereof. For example, the process flow 500 illustrates mechanisms that enable a wireless device 505 to apply an opportunistic gain based on a quantity of Rx chains at the Rx device, as described previously herein.

The process flow 500 includes a wireless device 505, a first network entity 510-*a*, and a second network entity 510-*b*, which may be examples of UEs 115, network entities 105, and other wireless devices as described herein. For example, the wireless device 505, the first network entity 510-*a*, and the second network entity 510-*b* illustrated in FIG. 5 may include examples of the wireless device 305, the first network entity 310-*a* and the second network entity 310-*b*, respectively, as illustrated in FIG. 3. In this regard, the wireless device 505 may include a UE 115, an IAB node, a CPE, or any combination thereof.

In some aspects, the first network entity 510-*a* and the second network entity 510-*b* may include separate devices or entities. In additional or alternative implementations, the first network entity 510-*a* and the second network entity 510-*b* may include or be associated with (e.g., supported by) the same device or entity. For example, in some cases, the respective network entities 510 may include serving cells (e.g., SCells, PCells, SPCells) supported by one or more devices or entities.

In some examples, the operations illustrated in process flow 500 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 515, the wireless device 505 may receive a control signal (e.g., RRC, DCI, MAC-CE) that indicates an RRM configuration associated with one or more measurement thresholds for managing one or more wireless communication links at the wireless device 505. For example, the control signal may indicate one or more thresholds from Table 1 above for managing wireless communication links at the wireless device 505. In this regard, the control signal may be configured with thresholds used for triggering events for managing communication links, such as thresholds for triggering cell addition, cell drop, cell handover, SCell addition, and the like.

For example, the one or more thresholds may include thresholds for performing a handover procedure, a cell addition procedure (e.g., secondary component carrier addition), a cell drop procedure (e.g., secondary component carrier drop), and the like. Additionally, or alternatively, the one or more thresholds may include a threshold for triggering or dropping dual connectivity (e.g., dual connectivity threshold, EN-DC threshold).

At 520, the wireless device 505 may receive one or more synchronization signals from the first network entity 510-*a*, the second network entity 510-*b*, or both. For example, in some cases, the wireless device 505 may receive synchronization signals (or some other reference signals) from both the network entities 510 in order to evaluate whether to perform a handover from the first network entity 510-*a* to the second network entity 510-*b*, to evaluate whether to add the second network entity 510-*b* and/or drop the first network entity 510-*a*, or any combination thereof. In some aspects, the wireless device 505 may receive the synchronization signals at 520 based on receiving the control signal at 515.

At 525, the wireless device 505 may perform one or more measurements for the synchronization signals received at 520. The measurements may include, but are not limited to, RSRP measurements, RSRQ measurements, SNR measurements, SINR measurements, CQI measurements, or any combination thereof. In particular, the wireless device 505 may perform the measurements in accordance with the RRM configuration received at 515. In other words, the wireless device 505 may perform measurements in order to evaluate applicable thresholds that are used to trigger events used to manage communication links at the wireless device 505.

At 530, the wireless device 505 may determine an opportunistic gain (e.g., nominal gain, diversity gain) that may be applied to the measurements performed at 525. In particular, at 530, the wireless device 505 may determine whether or not to apply an opportunistic gain to the measurements. In some aspects, the opportunistic gain may be based on a quantity of RF chains (e.g., Rx chains) usable for performing communications at the wireless device 505. The wireless device 505 may determine the opportunistic gain at 530 based on receiving the control signal (e.g., RRM configuration) at 515, receiving the reference signals at 520, performing the measurements at 525, or any combination thereof.

In some aspects, the wireless device 505 may determine the opportunistic gain (e.g., whether or not to apply the opportunistic gain) based on a number of parameters, conditions, or factors. Parameters or factors that may be used to determine the opportunistic gain may include, but are not limited to, a PHR metric, a pathloss metric, an antenna configuration associated with an antenna panel(s) at the wireless device 505 (e.g., antenna placement or form factor), simulation data (e.g., measurement procedures), frequency ranges/bands supported by the respective network entities 510, a duplexing configuration performed by the wireless device 505 (e.g., FDD, TDD), a battery or power level at the wireless device 505, or any combination thereof. Moreover, in some cases, the wireless device 505 may determine the opportunistic gain based on what types of RATs are supported by the respective network entities 510, based on a quantity of failed RACH attempts performed with the first network entity 510-*a* and/or the second network entity 510-*b*, and the like.

For example, the wireless device 505 may determine whether or not to apply the opportunistic gain based on whether a PHR metric and/or pathloss metric satisfy one or more respective thresholds. By way of another example, the wireless device 505 may determine whether to apply the opportunistic gain based on the first network entity 510-*a*/first serving cell being associated with a first RAT (e.g., LTE) and the second network entity 510-*b*/second serving cell being associated with a second RAT (e.g., NR) (in order to help trigger a handover from the first network entity 510-*a* to the second network entity 510-*b*). By way of another example, the wireless device 505 may determine whether or not to apply the opportunistic gain based on a battery or power level at the wireless device 505 (e.g., in order to manage communication links in a manner that will result in improved battery performance or reduce power consumption in low battery scenarios).

At 535, in cases where the wireless device 505 determines to apply the opportunistic gain at 535, the wireless device 505 may apply the opportunistic gain (e.g., nominal gain, diversity gain) to the measurements performed at 530 in order to generate modified measurements. As such, the wireless device 505 may apply the opportunistic gain at 535 based on receiving the control signal at 515, receiving the reference signals at 520, performing the measurements at 525, determining the opportunistic gain at 530, or any combination thereof.

At 540, the wireless device 505 may evaluate whether the modified measurements (e.g., measurements adjusted by the opportunistic gain) satisfy the one or more measurement thresholds associated with the RRM configuration indicated at 515. In other words, the wireless device 505 may determine whether or not the modified measurements satisfy one or more thresholds for transmitting a measurement report that may be used to trigger procedures for managing communication links at the wireless device, such as a cell addition/drop procedure, a handover procedure, and the like.

In cases where the modified measurements satisfy one or more measurement thresholds of the RRM configuration (e.g., step 540=YES), then the process flow 500 may proceed to 545.

At 545, the wireless device 505 may transmit a measurement report to the first network entity 510-*a*. In particular, the wireless device 505 may transmit the measurement report at 545 based on determining that the modified measurements satisfy the one or more measurement thresholds at 540. In some aspects, the measurement report may indicate the one or more modified measurements. In this regard, the measurement report may be generated based on the measurements performed at 525 and applying the opportunistic gain at 535. In some cases, the measurement report may include indications or requests for the wireless device 505 to perform one or more procedures for managing wireless communication links at the wireless device 505 (e.g., request or indication to perform a cell handover procedure, a cell addition/drop procedure, etc.).

At 550, the wireless device 505 may receive, from the first network entity 510-*a*, an additional control signal that instructs the wireless device 505 to manage one or more wireless communication links at the 505. In other words, the control signal may instruct the wireless device to perform a cell handover procedure, a cell addition procedure, a cell drop procedure, to add/drop a secondary component carrier, to add a cell for dual connectivity, or any combination thereof. In some aspects, the first network entity 510-*a* may transmit the additional control signal based on the measurement report received at 545.

For example, the additional control signal may indicate for the wireless device 505 to perform a handover procedure from the first network entity 510-*a* to the second network entity 510-*b*. By way of another example, the additional control signal may indicate for the wireless device 505 to add or drop the second network entity 510-*b* as a secondary cell or secondary component carrier.

At 555, the wireless device 505 may perform communications with the first network entity 510-*a*, the second network entity 510-*b*, or both, in accordance with the additional control signal received at 550. For example, in cases where the additional control signal instructs the wireless device 505 to perform a handover procedure, the wireless device 505 may perform communications to perform a handover procedure from the first network entity 510-*a* to the second network entity 510-*b*. By way of another example, in cases where the additional control signal instructs the wireless device 505 to add a secondary cell supported by the second network entity 510-*b*, the wireless device 505 may perform communications with the second network entity 510-*b* to perform the secondary cell addition procedure.

Techniques described herein may enable the wireless device 505 to take advantage of diversity gain offered by increased quantities of Rx chains by applying opportunistic gains to measurements performed by the wireless device 505. In this regard, aspects of the present disclosure may enable the wireless device 505 to apply an opportunistic gain for RRM procedures, which may enable the wireless device 505 to delay dropping an NR cell and switching to an LTE cell, or switch from an LTE cell to an NR cell earlier than would be possible for UEs with fewer Rx chains. Accordingly, aspects of the present disclosure may enable the wireless device 505 to perform RRM procedures (e.g., cell handovers, cell additions/drops, etc.) in such a manner as to improve throughput, as well as improve an overall efficiency and reliability of wireless communications.

Figure 6:
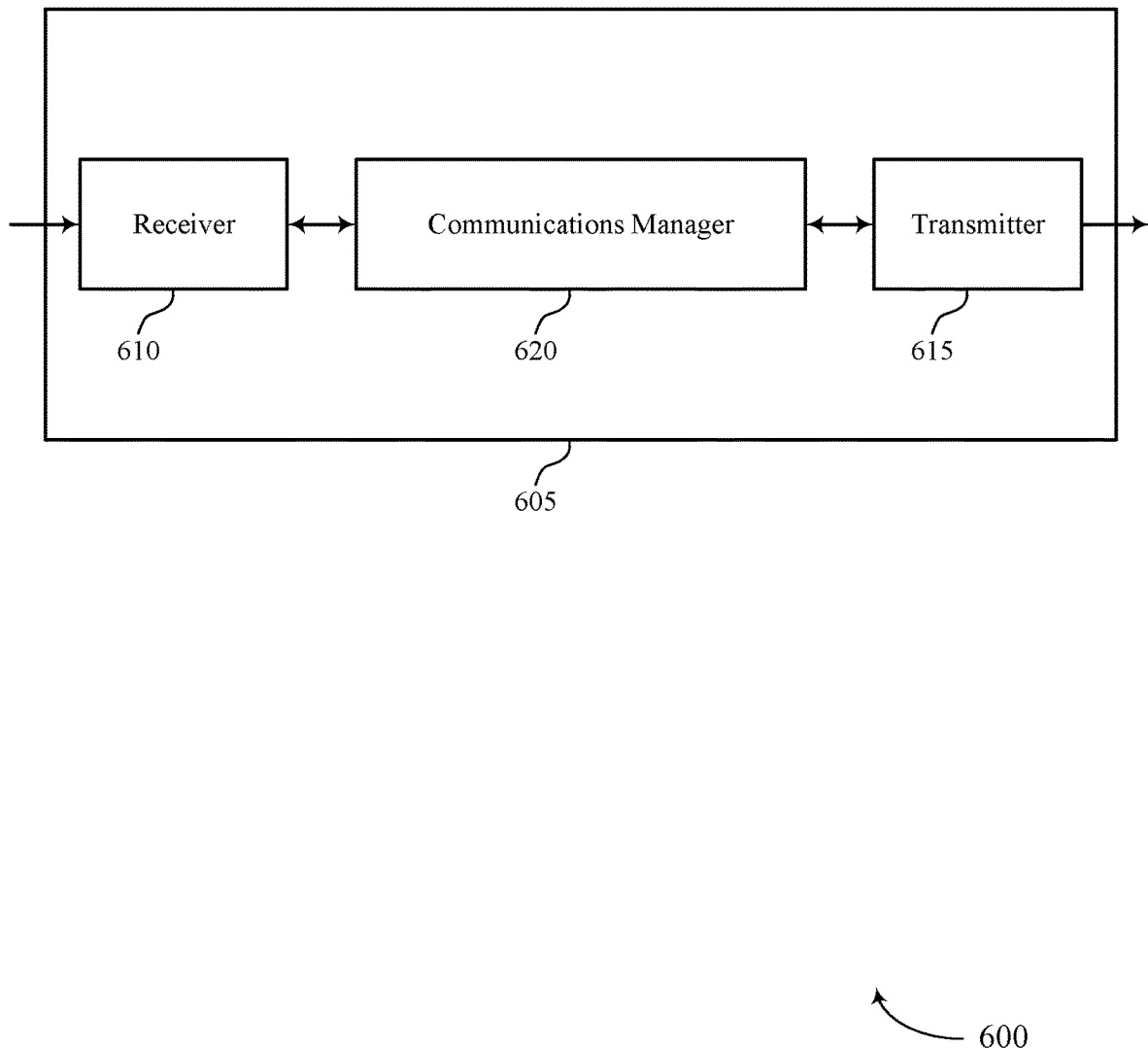
FIGS. 6 and 7 illustrate block diagrams of devices that support opportunistic reporting techniques for devices having increased quantities of Rx chains in accordance with one or more aspects of the present disclosure.

FIG. 6 illustrates a block diagram 600 of a device 605 that supports opportunistic reporting techniques for devices having increased quantities of Rx chains in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to opportunistic reporting techniques for devices having increased quantities of Rx chains). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to opportunistic reporting techniques for devices having increased quantities of Rx chains). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of opportunistic reporting techniques for devices having increased quantities of Rx chains as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a wireless device in accordance with examples as disclosed herein. For example, the communications manager 620 may be configured as or otherwise support a means for receiving a control signal that indicates an RRM configuration associated with one or more measurement thresholds for managing one or more wireless communication links at the wireless device. The communications manager 620 may be configured as or otherwise support a means for receiving one or more synchronization signals. The communications manager 620 may be configured as or otherwise support a means for performing one or more measurements for the one or more synchronization signals in accordance with the RRM configuration. The communications manager 620 may be configured as or otherwise support a means for generating one or more modified measurements based on applying an opportunistic gain to the one or more measurements, where the opportunistic gain is based on a quantity of RF chains usable for communicating via the one or more wireless communication links at the wireless device. The communications manager 620 may be configured as or otherwise support a means for transmitting a measurement report based on the one or more modified measurements satisfying the one or more measurement thresholds. The communications manager 620 may be configured as or otherwise support a means for receiving an additional control signal instructing the wireless device to manage the one or more wireless communication links based on the measurement report.

By including or configuring the communications manager 620 in accordance with examples as described herein, the device 605 (e.g., a processor controlling or otherwise coupled with the receiver 610, the transmitter 615, the communications manager 620, or a combination thereof) may support techniques that enable wireless devices to take advantage of diversity gain offered by increased quantities of Rx chains by applying opportunistic gains to measurements performed by the respective devices. In this regard, aspects of the present disclosure may enable wireless devices to apply an opportunistic gain for RRM procedures, which may enable the wireless devices to delay dropping an NR cell and switching to an LTE cell, or switch from an LTE cell to an NR cell earlier than would be possible for UEs with fewer Rx chains. Accordingly, aspects of the present disclosure may enable wireless devices to perform RRM procedures (e.g., cell handovers, cell additions/drops, etc.) in such a manner as to improve throughput at the respective devices, as well as improve an overall efficiency and reliability of wireless communications.

Figure 7:
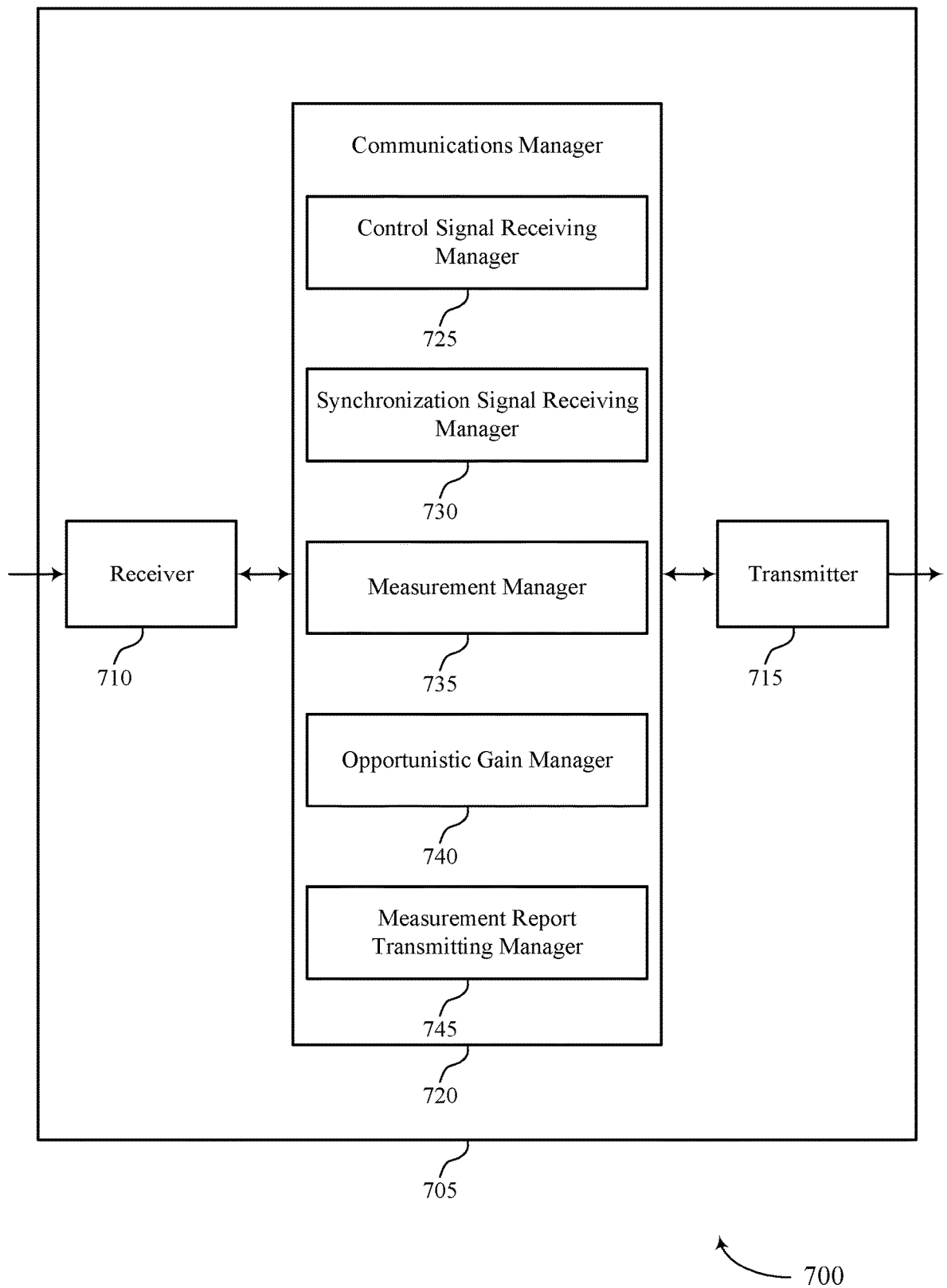

FIG. 7 illustrates a block diagram 700 of a device 705 that supports opportunistic reporting techniques for devices having increased quantities of Rx chains in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to opportunistic reporting techniques for devices having increased quantities of Rx chains). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to opportunistic reporting techniques for devices having increased quantities of Rx chains). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of opportunistic reporting techniques for devices having increased quantities of Rx chains as described herein. For example, the communications manager 720 may include a control signal receiving manager 725, a synchronization signal receiving manager 730, a measurement manager 735, an opportunistic gain manager 740, a measurement report transmitting manager 745, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a wireless device in accordance with examples as disclosed herein. The control signal receiving manager 725 may be configured as or otherwise support a means for receiving a control signal that indicates an RRM configuration associated with one or more measurement thresholds for managing one or more wireless communication links at the wireless device. The synchronization signal receiving manager 730 may be configured as or otherwise support a means for receiving one or more synchronization signals. The measurement manager 735 may be configured as or otherwise support a means for performing one or more measurements for the one or more synchronization signals in accordance with the RRM configuration. The opportunistic gain manager 740 may be configured as or otherwise support a means for generating one or more modified measurements based on applying an opportunistic gain to the one or more measurements, where the opportunistic gain is based on a quantity of RF chains usable for communicating via the one or more wireless communication links at the wireless device. The measurement report transmitting manager 745 may be configured as or otherwise support a means for transmitting a measurement report based on the one or more modified measurements satisfying the one or more measurement thresholds. The control signal receiving manager 725 may be configured as or otherwise support a means for receiving an additional control signal instructing the wireless device to manage the one or more wireless communication links based on the measurement report.

Figure 8:
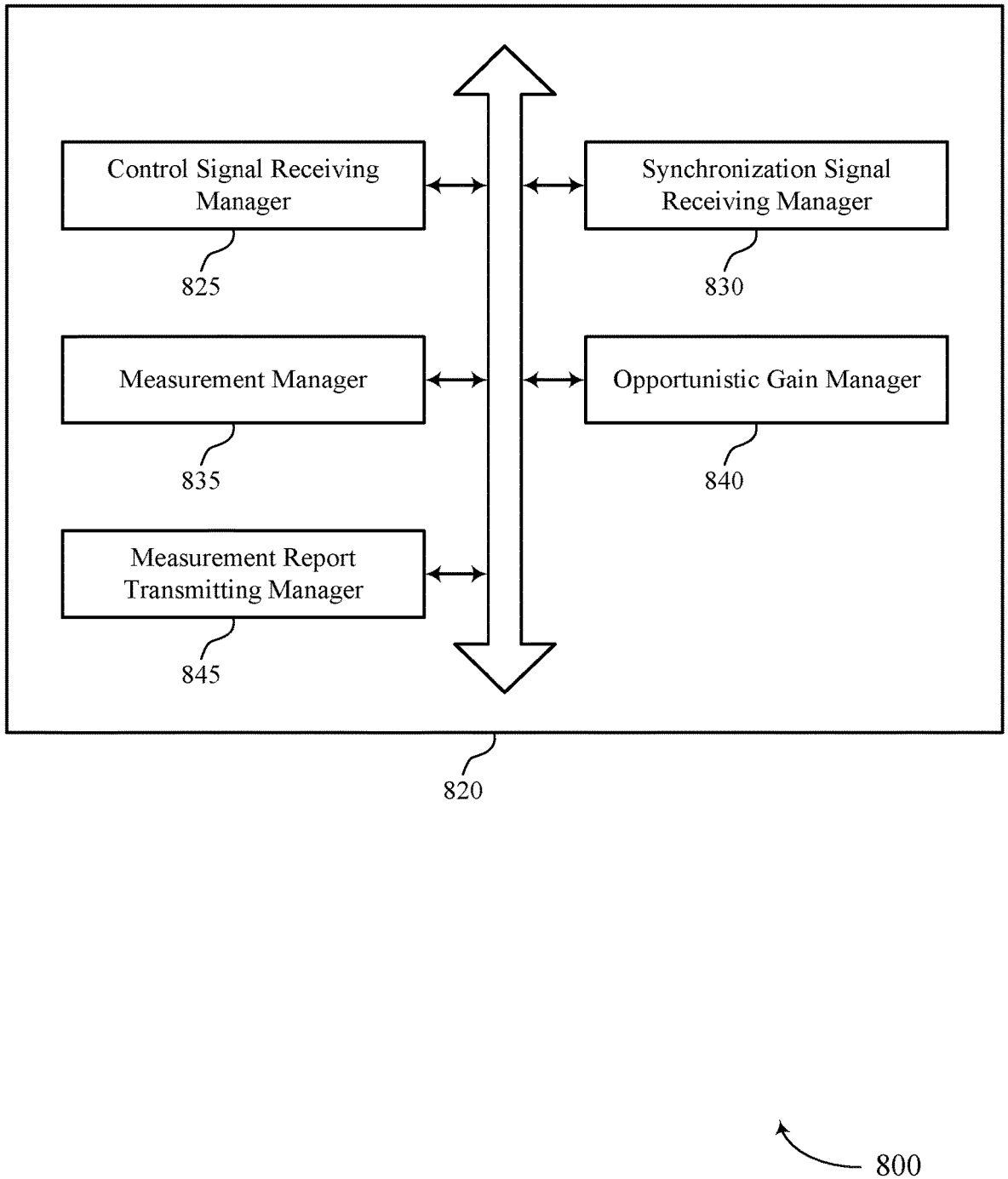
FIG. 8 illustrates a block diagram of a communications manager that supports opportunistic reporting techniques for devices having increased quantities of Rx chains in accordance with one or more aspects of the present disclosure.

FIG. 8 illustrates a block diagram 800 of a communications manager 820 that supports opportunistic reporting techniques for devices having increased quantities of Rx chains in accordance with one or more aspects of the present disclosure. The communications manager 820 may be an example of aspects of a communications manager 620, a communications manager 720, or both, as described herein. The communications manager 820, or various components thereof, may be an example of means for performing various aspects of opportunistic reporting techniques for devices having increased quantities of Rx chains as described herein. For example, the communications manager 820 may include a control signal receiving manager 825, a synchronization signal receiving manager 830, a measurement manager 835, an opportunistic gain manager 840, a measurement report transmitting manager 845, or any combination thereof. Each of these components may communicate, directly or indirectly, with one another (e.g., via one or more buses).

The communications manager 820 may support wireless communication at a wireless device in accordance with examples as disclosed herein. The control signal receiving manager 825 may be configured as or otherwise support a means for receiving a control signal that indicates an RRM configuration associated with one or more measurement thresholds for managing one or more wireless communication links at the wireless device. The synchronization signal receiving manager 830 may be configured as or otherwise support a means for receiving one or more synchronization signals. The measurement manager 835 may be configured as or otherwise support a means for performing one or more measurements for the one or more synchronization signals in accordance with the RRM configuration. The opportunistic gain manager 840 may be configured as or otherwise support a means for generating one or more modified measurements based on applying an opportunistic gain to the one or more measurements, where the opportunistic gain is based on a quantity of RF chains usable for communicating via the one or more wireless communication links at the wireless device. The measurement report transmitting manager 845 may be configured as or otherwise support a means for transmitting a measurement report based on the one or more modified measurements satisfying the one or more measurement thresholds. In some examples, the control signal receiving manager 825 may be configured as or otherwise support a means for receiving an additional control signal instructing the wireless device to manage the one or more wireless communication links based on the measurement report.

In some examples, the opportunistic gain manager 840 may be configured as or otherwise support a means for determining whether to apply the opportunistic gain based on a PHR metric, a pathloss metric, or both, satisfying one or more thresholds, where the PHR metric, the pathloss metric, or both, are based on the one or more measurements.

In some examples, the one or more synchronization signals are received via a first serving cell and a second serving cell, and the opportunistic gain manager 840 may be configured as or otherwise support a means for determining the opportunistic gain based on the first serving cell being associated with a first RAT and the second serving cell being associated with a second RAT different from the first RAT.

In some examples, the wireless device includes an antenna panel associated with the quantity of RF chains, and the opportunistic gain manager 840 may be configured as or otherwise support a means for determining the opportunistic gain based on an antenna configuration including one or more parameters associated with the antenna panel.

In some examples, the one or more parameters associated with the antenna panel include a placement of antenna elements within the antenna panel, an antenna form factor of the antenna panel, or both.

In some examples, the measurement manager 835 may be configured as or otherwise support a means for performing one or more measurement procedures to generate measurement data based on the one or more measurements and the quantity of RF chains, where the opportunistic gain is based on the measurement data.

In some examples, the opportunistic gain manager 840 may be configured as or otherwise support a means for determining the opportunistic gain based on a frequency band associated with the one or more synchronization signals communicated with a RAT associated with the one or more wireless communication links.

In some examples, the opportunistic gain manager 840 may be configured as or otherwise support a means for determining the opportunistic gain based on a duplexing configuration associated with communications performed via the one or more wireless communication links, the duplexing configuration including a frequency division duplexing configuration, a time division duplexing configuration, or both.

In some examples, the opportunistic gain manager 840 may be configured as or otherwise support a means for determining the opportunistic gain based on a battery level associated with the wireless device being greater than or equal to a threshold battery level.

In some examples, the one or more synchronization signals are received via a serving cell, and the opportunistic gain manager 840 may be configured as or otherwise support a means for determining the opportunistic gain based on a quantity of failed RACH attempts associated with the serving cell.

In some examples, the one or more measurement thresholds of the RRM configuration include a first threshold for performing a handover procedure associated with the one or more wireless communication links, a second threshold for performing a cell addition procedure associated the one or more wireless communication links, a third threshold for performing a cell drop procedure associated with the one or more wireless communication links, or any combination thereof. In some examples, the additional control signal indicates for the wireless device to perform the handover procedure, perform the cell addition procedure, perform the cell drop procedure, or any combination thereof.

In some examples, the one or more measurement thresholds of the RRM configuration include a dual connectivity threshold, a secondary component carrier addition threshold, a secondary component carrier drop threshold, or any combination thereof. In some examples, the additional control signal indicates for the wireless device to add a serving cell for dual connectivity operation, add a secondary component carrier, drop an additional secondary component carrier, or any combination thereof.

In some examples, to support performing the one or more measurements, the measurement manager 835 may be configured as or otherwise support a means for performing, for the one or more synchronization signals, one or more RSRP measurements, one or more SNR measurements, one or more CQI measurements, or any combination thereof. In some examples, the wireless device includes a CPE, a UE, or both.

Figure 9:
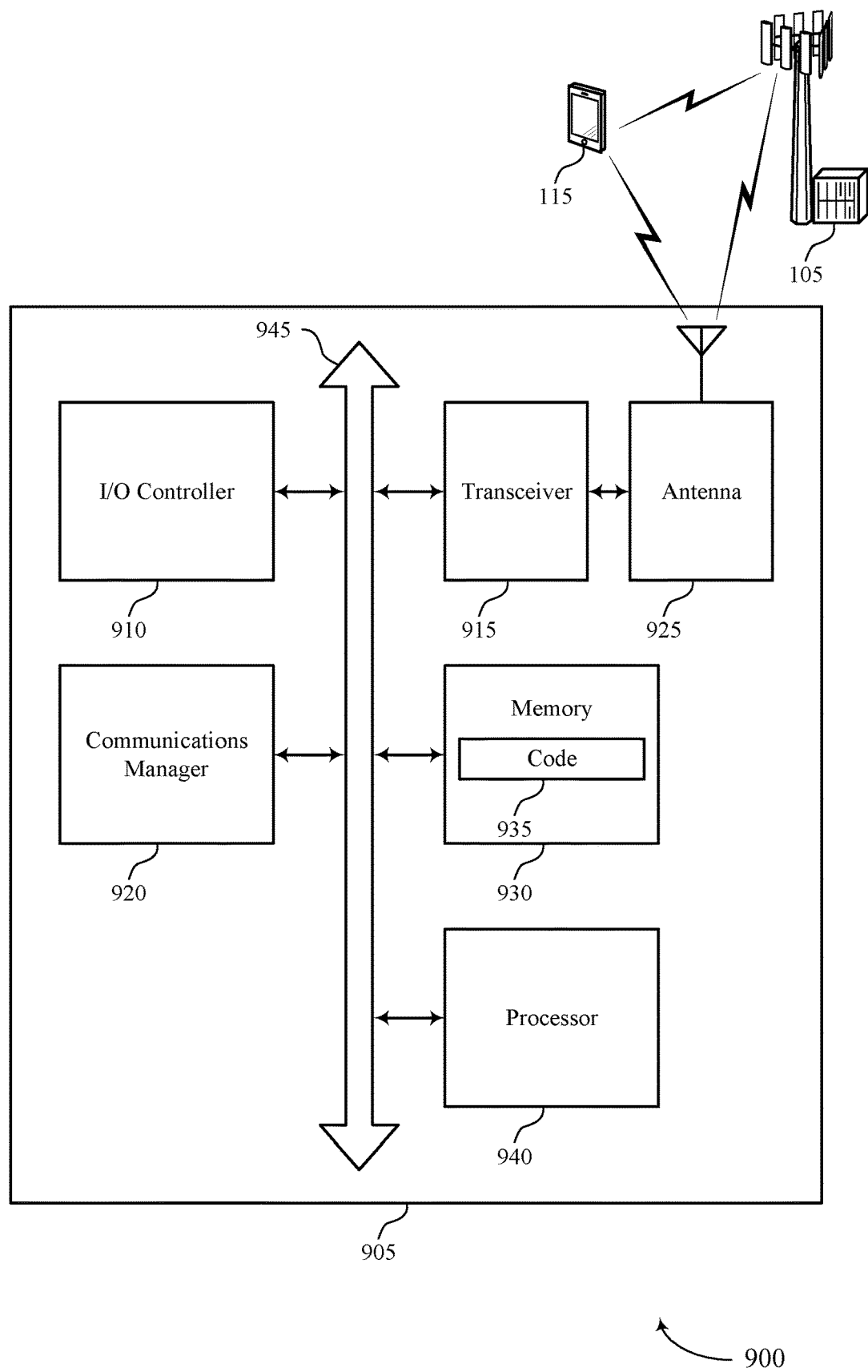
FIG. 9 illustrates a diagram of a system including a device that supports opportunistic reporting techniques for devices having increased quantities of Rx chains in accordance with one or more aspects of the present disclosure.

FIG. 9 illustrates a diagram of a system 900 including a device 905 that supports opportunistic reporting techniques for devices having increased quantities of Rx chains in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bidirectionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting opportunistic reporting techniques for devices having increased quantities of Rx chains). For example, the device 905 or a component of the device 905 may include a processor 940 and memory 930 coupled with or to the processor 940, the processor 940 and memory 930 configured to perform various functions described herein.

The communications manager 920 may support wireless communication at a wireless device in accordance with examples as disclosed herein. For example, the communications manager 920 may be configured as or otherwise support a means for receiving a control signal that indicates an RRM configuration associated with one or more measurement thresholds for managing one or more wireless communication links at the wireless device. The communications manager 920 may be configured as or otherwise support a means for receiving one or more synchronization signals. The communications manager 920 may be configured as or otherwise support a means for performing one or more measurements for the one or more synchronization signals in accordance with the RRM configuration. The communications manager 920 may be configured as or otherwise support a means for generating one or more modified measurements based on applying an opportunistic gain to the one or more measurements, where the opportunistic gain is based on a quantity of RF chains usable for communicating via the one or more wireless communication links at the wireless device. The communications manager 920 may be configured as or otherwise support a means for transmitting a measurement report based on the one or more modified measurements satisfying the one or more measurement thresholds. The communications manager 920 may be configured as or otherwise support a means for receiving an additional control signal instructing the wireless device to manage the one or more wireless communication links based on the measurement report.

By including or configuring the communications manager 920 in accordance with examples as described herein, the device 905 may support techniques that enable wireless devices to take advantage of diversity gain offered by increased quantities of Rx chains by applying opportunistic gains to measurements performed by the respective devices. In this regard, aspects of the present disclosure may enable wireless devices to apply an opportunistic gain for RRM procedures, which may enable the wireless devices to delay dropping an NR cell and switching to an LTE cell, or switch from an LTE cell to an NR cell earlier than would be possible for UEs with fewer Rx chains. Accordingly, aspects of the present disclosure may enable wireless devices to perform RRM procedures (e.g., cell handovers, cell additions/drops, etc.) in such a manner as to improve throughput at the respective devices, as well as improve an overall efficiency and reliability of wireless communications.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of opportunistic reporting techniques for devices having increased quantities of Rx chains as described herein, or the processor 940 and the memory 930 may be otherwise configured to perform or support such operations.

Figure 10:
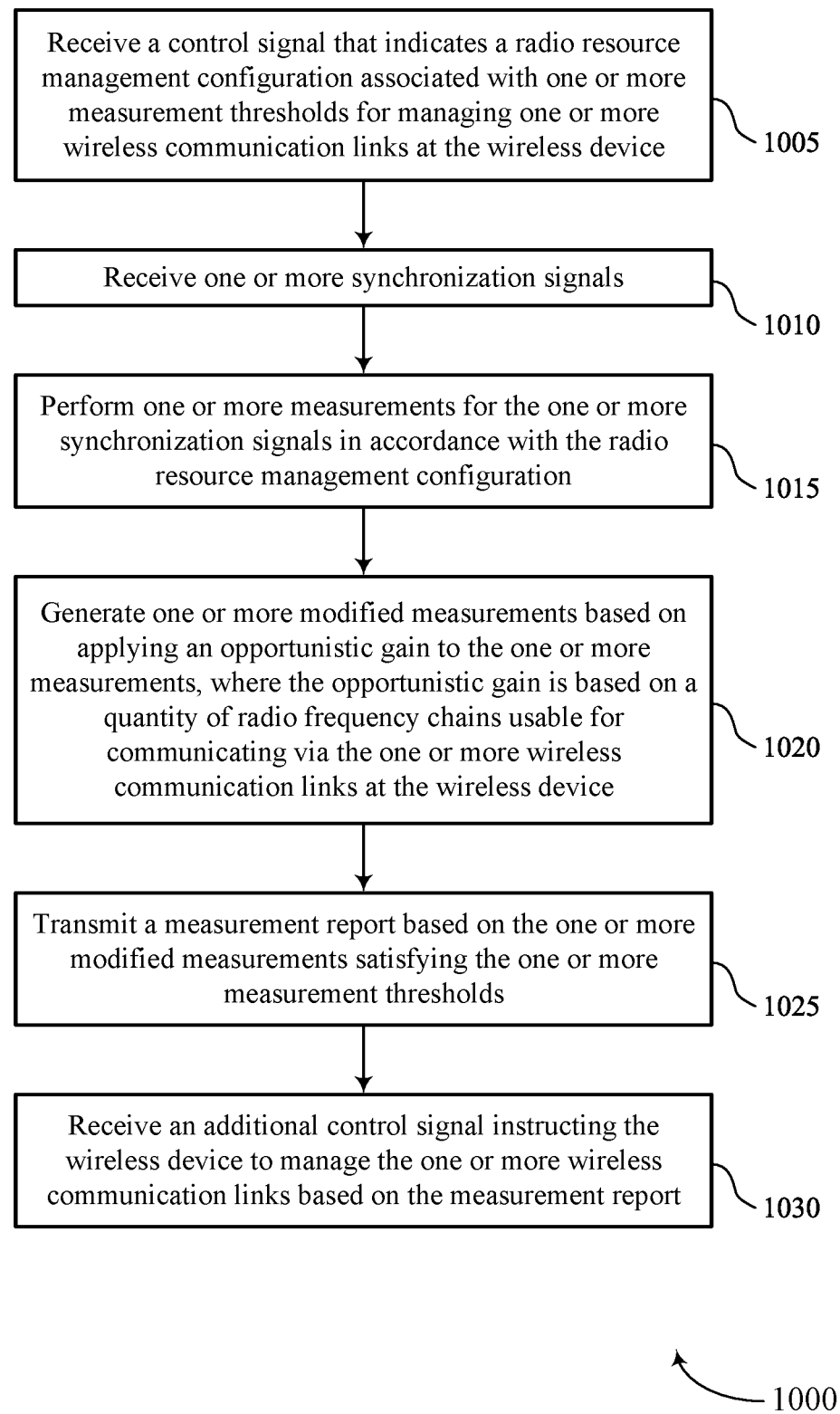
FIGS. 10 through 12 illustrate flowcharts showing methods that support opportunistic reporting techniques for devices having increased quantities of Rx chains in accordance with one or more aspects of the present disclosure.

FIG. 10 illustrates a flowchart showing a method 1000 that supports opportunistic reporting techniques for devices having increased quantities of Rx chains in accordance with one or more aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include receiving a control signal that indicates an RRM configuration associated with one or more measurement thresholds for managing one or more wireless communication links at the wireless device. The operations of 1005 may be performed in accordance with examples as disclosed herein. In some examples, aspects of the operations of 1005 may be performed by a control signal receiving manager 825 as described with reference to FIG. 8.

At 1010, the method may include receiving one or more synchronization signals. The operations of 1010 may be performed in accordance with examples as disclosed herein. In some examples, aspects of the operations of 1010 may be performed by a synchronization signal receiving manager 830 as described with reference to FIG. 8.

At 1015, the method may include performing one or more measurements for the one or more synchronization signals in accordance with the RRM configuration. The operations of 1015 may be performed in accordance with examples as disclosed herein. In some examples, aspects of the operations of 1015 may be performed by a measurement manager 835 as described with reference to FIG. 8.

At 1020, the method may include generating one or more modified measurements based on applying an opportunistic gain to the one or more measurements, where the opportunistic gain is based on a quantity of RF chains usable for communicating via the one or more wireless communication links at the wireless device. The operations of 1020 may be performed in accordance with examples as disclosed herein. In some examples, aspects of the operations of 1020 may be performed by an opportunistic gain manager 840 as described with reference to FIG. 8.

At 1025, the method may include transmitting a measurement report based on the one or more modified measurements satisfying the one or more measurement thresholds. The operations of 1025 may be performed in accordance with examples as disclosed herein. In some examples, aspects of the operations of 1025 may be performed by a measurement report transmitting manager 845 as described with reference to FIG. 8.

At 1030, the method may include receiving an additional control signal instructing the wireless device to manage the one or more wireless communication links based on the measurement report. The operations of 1030 may be performed in accordance with examples as disclosed herein. In some examples, aspects of the operations of 1030 may be performed by a control signal receiving manager 825 as described with reference to FIG. 8.

Figure 11:
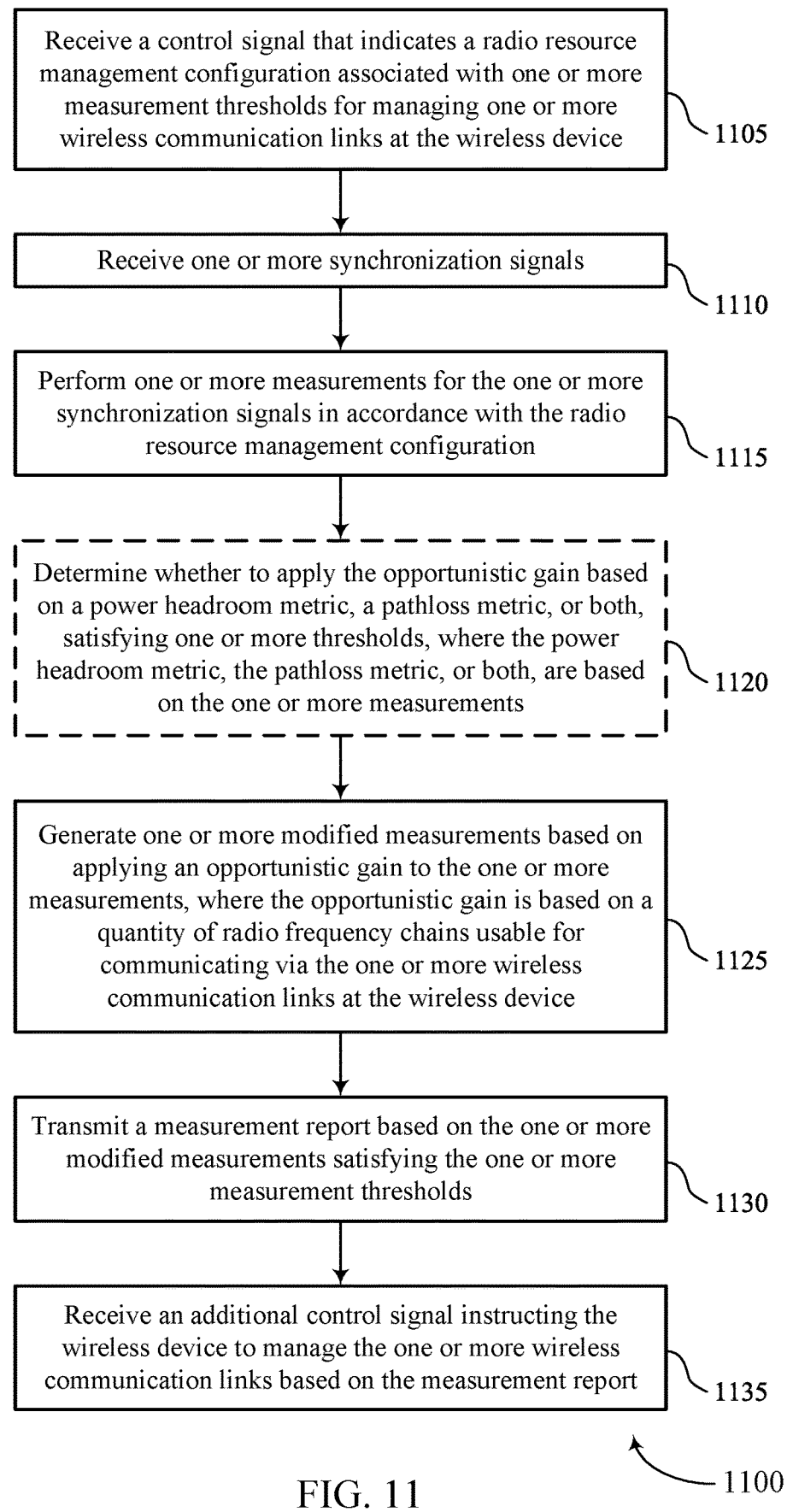

FIG. 11 illustrates a flowchart showing a method 1100 that supports opportunistic reporting techniques for devices having increased quantities of Rx chains in accordance with one or more aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include receiving a control signal that indicates an RRM configuration associated with one or more measurement thresholds for managing one or more wireless communication links at the wireless device. The operations of 1105 may be performed in accordance with examples as disclosed herein. In some examples, aspects of the operations of 1105 may be performed by a control signal receiving manager 825 as described with reference to FIG. 8.

At 1110, the method may include receiving one or more synchronization signals. The operations of 1110 may be performed in accordance with examples as disclosed herein. In some examples, aspects of the operations of 1110 may be performed by a synchronization signal receiving manager 830 as described with reference to FIG. 8.

At 1115, the method may include performing one or more measurements for the one or more synchronization signals in accordance with the RRM configuration. The operations of 1115 may be performed in accordance with examples as disclosed herein.

In some examples, aspects of the operations of 1115 may be performed by a measurement manager 835 as described with reference to FIG. 8.

At 1120, the method may include determining whether to apply the opportunistic gain based on a PHR metric, a pathloss metric, or both, satisfying one or more thresholds, where the PHR metric, the pathloss metric, or both, are based on the one or more measurements. The operations of 1120 may be performed in accordance with examples as disclosed herein. In some examples, aspects of the operations of 1120 may be performed by an opportunistic gain manager 840 as described with reference to FIG. 8.

At 1125, the method may include generating one or more modified measurements based on applying an opportunistic gain to the one or more measurements, where the opportunistic gain is based on a quantity of RF chains usable for communicating via the one or more wireless communication links at the wireless device. The operations of 1125 may be performed in accordance with examples as disclosed herein. In some examples, aspects of the operations of 1125 may be performed by an opportunistic gain manager 840 as described with reference to FIG. 8.

At 1130, the method may include transmitting a measurement report based on the one or more modified measurements satisfying the one or more measurement thresholds. The operations of 1130 may be performed in accordance with examples as disclosed herein. In some examples, aspects of the operations of 1130 may be performed by a measurement report transmitting manager 845 as described with reference to FIG. 8.

At 1135, the method may include receiving an additional control signal instructing the wireless device to manage the one or more wireless communication links based on the measurement report. The operations of 1135 may be performed in accordance with examples as disclosed herein. In some examples, aspects of the operations of 1135 may be performed by a control signal receiving manager 825 as described with reference to FIG. 8.

Figure 12:
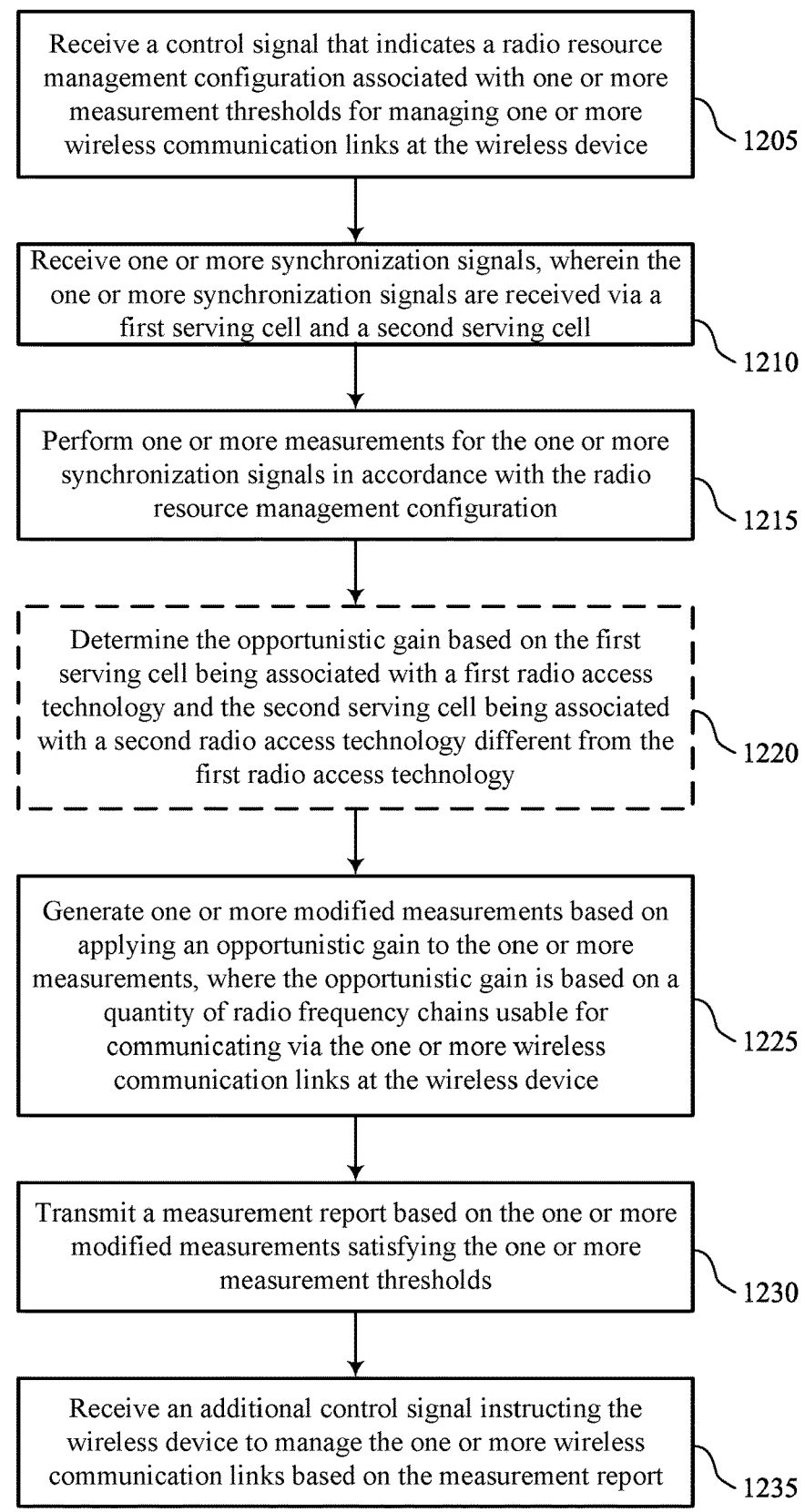

FIG. 12 illustrates a flowchart showing a method 1200 that supports opportunistic reporting techniques for devices having increased quantities of Rx chains in accordance with one or more aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include receiving a control signal that indicates an RRM configuration associated with one or more measurement thresholds for managing one or more wireless communication links at the wireless device. The operations of 1205 may be performed in accordance with examples as disclosed herein. In some examples, aspects of the operations of 1205 may be performed by a control signal receiving manager 825 as described with reference to FIG. 8.

At 1210, the method may include receiving one or more synchronization signals, wherein the one or more synchronization signals are received via a first serving cell and a second serving cell. The operations of 1210 may be performed in accordance with examples as disclosed herein. In some examples, aspects of the operations of 1210 may be performed by a synchronization signal receiving manager 830 as described with reference to FIG. 8.

At 1215, the method may include performing one or more measurements for the one or more synchronization signals in accordance with the RRM configuration. The operations of 1215 may be performed in accordance with examples as disclosed herein. In some examples, aspects of the operations of 1215 may be performed by a measurement manager 835 as described with reference to FIG. 8.

At 1220, the method may include determining the opportunistic gain based on the first serving cell being associated with a first RAT and the second serving cell being associated with a second RAT different from the first RAT. The operations of 1220 may be performed in accordance with examples as disclosed herein. In some examples, aspects of the operations of 1220 may be performed by an opportunistic gain manager 840 as described with reference to FIG. 8.

At 1225, the method may include generating one or more modified measurements based on applying an opportunistic gain to the one or more measurements, where the opportunistic gain is based on a quantity of RF chains usable for communicating via the one or more wireless communication links at the wireless device. The operations of 1225 may be performed in accordance with examples as disclosed herein. In some examples, aspects of the operations of 1225 may be performed by an opportunistic gain manager 840 as described with reference to FIG. 8.

At 1230, the method may include transmitting a measurement report based on the one or more modified measurements satisfying the one or more measurement thresholds. The operations of 1230 may be performed in accordance with examples as disclosed herein. In some examples, aspects of the operations of 1230 may be performed by a measurement report transmitting manager 845 as described with reference to FIG. 8.

At 1235, the method may include receiving an additional control signal instructing the wireless device to manage the one or more wireless communication links based on the measurement report. The operations of 1235 may be performed in accordance with examples as disclosed herein. In some examples, aspects of the operations of 1235 may be performed by a control signal receiving manager 825 as described with reference to FIG. 8.

The following provides an overview of aspects of the present disclosure:

Aspect 1: A method for wireless communication at a wireless device, comprising: receiving a control signal that indicates a RRM configuration associated with one or more measurement thresholds for managing one or more wireless communication links at the wireless device; receiving one or more synchronization signals; performing one or more measurements for the one or more synchronization signals in accordance with the RRM configuration; generating one or more modified measurements based at least in part on applying an opportunistic gain to the one or more measurements, wherein the opportunistic gain is based at least in part on a quantity of radio frequency chains usable for communicating via the one or more wireless communication links at the wireless device; transmitting a measurement report based at least in part on the one or more modified measurements satisfying the one or more measurement thresholds; and receiving an additional control signal instructing the wireless device to manage the one or more wireless communication links based at least in part on the measurement report.

Aspect 2: The method of aspect 1, further comprising: determining whether to apply the opportunistic gain based at least in part on a PHR metric, a pathloss metric, or both, satisfying one or more thresholds, wherein the PHR metric, the pathloss metric, or both, are based at least in part on the one or more measurements.

Aspect 3: The method of any of aspects 1 through 2, wherein the one or more synchronization signals are received via a first serving cell and a second serving cell, the method further comprising: determining the opportunistic gain based at least in part on the first serving cell being associated with a first RAT and the second serving cell being associated with a second RAT different from the first RAT.

Aspect 4: The method of any of aspects 1 through 3, wherein the wireless device comprises an antenna panel associated with the quantity of radio frequency chains, the method further comprising: determining the opportunistic gain based at least in part on an antenna configuration comprising one or more parameters associated with the antenna panel.

Aspect 5: The method of aspect 4, wherein the one or more parameters associated with the antenna panel comprise a placement of antenna elements within the antenna panel, an antenna form factor of the antenna panel, or both.

Aspect 6: The method of any of aspects 1 through 5, further comprising: performing one or more measurement procedures to generate measurement data based at least in part on the one or more measurements and the quantity of radio frequency chains, wherein the opportunistic gain is based at least in part on the measurement data.

Aspect 7: The method of any of aspects 1 through 6, further comprising: determining the opportunistic gain based at least in part on a frequency band associated with the one or more synchronization signals communicated with a RAT associated with the one or more wireless communication links.

Aspect 8: The method of any of aspects 1 through 7, further comprising: determining the opportunistic gain based at least in part on a duplexing configuration associated with communications performed via the one or more wireless communication links, the duplexing configuration comprising a FDD configuration, a TDD configuration, or both.

Aspect 9: The method of any of aspects 1 through 8, further comprising: determining the opportunistic gain based at least in part on a battery level associated with the wireless device being greater than or equal to a threshold battery level.

Aspect 10: The method of any of aspects 1 through 9, wherein the one or more synchronization signals are received via a serving cell, the method further comprising: determining the opportunistic gain based at least in part on a quantity of failed RACH attempts associated with the serving cell.

Aspect 11: The method of any of aspects 1 through 10, wherein the one or more measurement thresholds of the RRM configuration comprise a first threshold for performing a handover procedure associated with the one or more wireless communication links, a second threshold for performing a cell addition procedure associated the one or more wireless communication links, a third threshold for performing a cell drop procedure associated with the one or more wireless communication links, or any combination thereof, the additional control signal indicates for the wireless device to perform the handover procedure, perform the cell addition procedure, perform the cell drop procedure, or any combination thereof.

Aspect 12: The method of any of aspects 1 through 11, wherein the one or more measurement thresholds of the RRM configuration comprise a dual connectivity threshold, a secondary component carrier addition threshold, a secondary component carrier drop threshold, or any combination thereof, the additional control signal indicates for the wireless device to add a serving cell for dual connectivity operation, add a secondary component carrier, drop an additional secondary component carrier, or any combination thereof.

Aspect 13: The method of any of aspects 1 through 12, wherein performing the one or more measurements comprises: performing, for the one or more synchronization signals, one or more reference signal received power measurements, one or more SNR measurements, one or more CQI measurements, or any combination thereof.

Aspect 14: The method of any of aspects 1 through 13, wherein the wireless device comprises a CPE, a UE, or both.

Aspect 15: An apparatus for wireless communication at a wireless device, comprising a processor; memory coupled with the processor; and instructions stored in the memory and executable by the processor to cause the apparatus to perform a method of any of aspects 1 through 14.

Aspect 16: An apparatus for wireless communication at a wireless device, comprising at least one means for performing a method of any of aspects 1 through 14.

Aspect 17: A non-transitory computer-readable medium storing code for wireless communication at a wireless device, the code comprising instructions executable by a processor to perform a method of any of aspects 1 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a wireless device, comprising:
    one or more processors; and
    one or more memories coupled with the one or more processors, the one or more processors configured to cause the wireless device to:
        receive a control signal that indicates a radio resource management configuration associated with one or more measurement thresholds for management of one or more wireless communication links at the wireless device;
        receive one or more synchronization signals;
        perform one or more measurements for the one or more synchronization signals in accordance with the radio resource management configuration;
        generate one or more modified measurements based at least in part on application of a gain to the one or more measurements, wherein the gain is based at least in part on a quantity of radio frequency chains to be used to communicate via the one or more wireless communication links at the wireless device;
        transmit a measurement report based at least in part on the one or more modified measurements that satisfy the one or more measurement thresholds; and
        receive an additional control signal that instructs the wireless device to manage the one or more wireless communication links based at least in part on the measurement report.

2. The apparatus of claim 1, wherein the one or more processors are further configured to:
    determine whether to apply the gain based at least in part on a power headroom metric, a pathloss metric, or both, that satisfy one or more thresholds, wherein the power headroom metric, the pathloss metric, or both, are based at least in part on the one or more measurements.

3. The apparatus of claim 1, wherein the one or more synchronization signals are received via a first serving cell and a second serving cell, wherein the one or more processors are further configured to cause the wireless device to:
    determine the gain based at least in part on the first serving cell that is associated with a first radio access technology and the second serving cell that is associated with a second radio access technology different from the first radio access technology.

4. The apparatus of claim 1, wherein the wireless device comprises an antenna panel associated with the quantity of radio frequency chains, wherein the one or more processors are further configured to cause the wireless device to:
    determine the gain based at least in part on an antenna configuration that comprises one or more parameters associated with the antenna panel.

5. The apparatus of claim 4, wherein the one or more parameters associated with the antenna panel comprise a placement of antenna elements within the antenna panel, an antenna form factor of the antenna panel, or both.

6. The apparatus of claim 1, wherein the one or more processors are further configured to cause the wireless device to:
    perform one or more measurement procedures to generate measurement data based at least in part on the one or more measurements and the quantity of radio frequency chains, wherein the gain is based at least in part on the measurement data.

7. The apparatus of claim 1, wherein the one or more processors are further configured to cause the wireless device to:
    determine the gain based at least in part on a frequency band associated with the one or more synchronization signals communicated with a radio access technology associated with the one or more wireless communication links.

8. The apparatus of claim 1, wherein the one or more processors are further configured to:
    determine the gain based at least in part on a duplexing configuration associated with communications performed via the one or more wireless communication links, wherein the duplexing configuration comprises a frequency division duplexing configuration, a time division duplexing configuration, or both.

9. The apparatus of claim 1, wherein the one or more processors are further configured to:
    determine the gain based at least in part on a battery level associated with the wireless device that is greater than or equal to a threshold battery level.

10. The apparatus of claim 1, wherein the one or more synchronization signals are received via a serving cell, wherein the one or more processors are further configured to:
    determine the gain based at least in part on a quantity of failed random access channel attempts associated with the serving cell.

11. The apparatus of claim 1, wherein the one or more measurement thresholds of the radio resource management configuration comprise a first threshold for performance of a handover procedure associated with the one or more wireless communication links, a second threshold for performance of a cell addition procedure associated the one or more wireless communication links, a third threshold for performance of a cell drop procedure associated with the one or more wireless communication links, or any combination thereof, wherein the additional control signal indicates for the wireless device to perform the handover procedure, perform the cell addition procedure, perform the cell drop procedure, or any combination thereof.

12. The apparatus of claim 1, wherein the one or more measurement thresholds of the radio resource management configuration comprise a dual connectivity threshold, a secondary component carrier addition threshold, a secondary component carrier drop threshold, or any combination thereof, wherein the additional control signal indicates for the wireless device to add a serving cell for dual connectivity operation, add a secondary component carrier, drop an additional secondary component carrier, or any combination thereof.

13. The apparatus of claim 1, wherein, to perform the one or more measurements, the one or more processors are further configured to cause the wireless device to:
perform, for the one or more synchronization signals, one or more reference signal received power measurements, one or more signal-to-noise ratio measurements, one or more channel quality indicator measurements, or any combination thereof.

14. The apparatus of claim 1, wherein the wireless device comprises a customer premises equipment, a user equipment (UE), or both.

15. A method for wireless communication at a wireless device, comprising:
receiving a control signal that indicates a radio resource management configuration associated with one or more measurement thresholds for managing one or more wireless communication links at the wireless device;
receiving one or more synchronization signals;
performing one or more measurements for the one or more synchronization signals in accordance with the radio resource management configuration;
generating one or more modified measurements based at least in part on applying a gain to the one or more measurements, wherein the gain is based at least in part on a quantity of radio frequency chains to be used for communicating via the one or more wireless communication links at the wireless device;
transmitting a measurement report based at least in part on the one or more modified measurements satisfying the one or more measurement thresholds; and
receiving an additional control signal instructing the wireless device to manage the one or more wireless communication links based at least in part on the measurement report.

16. The method of claim 15, further comprising:
determining whether to apply the gain based at least in part on a power headroom metric, a pathloss metric, or both, satisfying one or more thresholds, wherein the power headroom metric, the pathloss metric, or both, are based at least in part on the one or more measurements.

17. The method of claim 15, wherein the one or more synchronization signals are received via a first serving cell and a second serving cell, the method further comprising:
determining the gain based at least in part on the first serving cell being associated with a first radio access technology and the second serving cell being associated with a second radio access technology different from the first radio access technology.

18. The method of claim 15, wherein the wireless device comprises an antenna panel associated with the quantity of radio frequency chains, the method further comprising:
determining the gain based at least in part on an antenna configuration comprising one or more parameters associated with the antenna panel.

19. The method of claim 18, wherein the one or more parameters associated with the antenna panel comprise a placement of antenna elements within the antenna panel, an antenna form factor of the antenna panel, or both.

20. The method of claim 15, further comprising:
performing one or more measurement procedures to generate measurement data based at least in part on the one or more measurements and the quantity of radio frequency chains, wherein the gain is based at least in part on the measurement data.

21. The method of claim 15, further comprising:
determining the gain based at least in part on a frequency band associated with the one or more synchronization signals communicated with a radio access technology associated with the one or more wireless communication links.

22. The method of claim 15, further comprising:
determining the gain based at least in part on a duplexing configuration associated with communications performed via the one or more wireless communication links, the duplexing configuration comprising a frequency division duplexing configuration, a time division duplexing configuration, or both.

23. The method of claim 15, further comprising:
determining the gain based at least in part on a battery level associated with the wireless device being greater than or equal to a threshold battery level.

24. The method of claim 15, wherein the one or more synchronization signals are received via a serving cell, the method further comprising:
determining the gain based at least in part on a quantity of failed random access channel attempts associated with the serving cell.

25. The method of claim 15, wherein the one or more measurement thresholds of the radio resource management configuration comprise a first threshold for performing a handover procedure associated with the one or more wireless communication links, a second threshold for performing a cell addition procedure associated the one or more wireless communication links, a third threshold for performing a cell drop procedure associated with the one or more wireless communication links, or any combination thereof, wherein the additional control signal indicates for the wireless device to perform the handover procedure, perform the cell addition procedure, perform the cell drop procedure, or any combination thereof.

26. The method of claim 15, wherein the one or more measurement thresholds of the radio resource management configuration comprise a dual connectivity threshold, a secondary component carrier addition threshold, a secondary component carrier drop threshold, or any combination thereof, wherein the additional control signal indicates for the wireless device to add a serving cell for dual connectivity operation, add a secondary component carrier, drop an additional secondary component carrier, or any combination thereof.

27. The method of claim 15, wherein performing the one or more measurements comprises:
performing, for the one or more synchronization signals, one or more reference signal received power measurements, one or more signal-to-noise ratio measurements, one or more channel quality indicator measurements, or any combination thereof.

28. The method of claim 15, wherein the wireless device comprises a customer premises equipment, a user equipment (UE), or both.

29. An apparatus for wireless communication at a wireless device, comprising:
means for receiving a control signal that indicates a radio resource management configuration associated with one or more measurement thresholds for managing one or more wireless communication links at the wireless device;
means for receiving one or more synchronization signals;
means for performing one or more measurements for the one or more synchronization signals in accordance with the radio resource management configuration;
means for generating one or more modified measurements based at least in part on applying a gain to the one or more measurements, wherein the gain is based at least in part on a quantity of radio frequency chains to be used for communicating via the one or more wireless communication links at the wireless device;
means for transmitting a measurement report based at least in part on the one or more modified measurements satisfying the one or more measurement thresholds; and
means for receiving an additional control signal instructing the wireless device to manage the one or more wireless communication links based at least in part on the measurement report.

30. A non-transitory computer-readable medium storing code for wireless communication at a wireless device, the code comprising instructions executable by a processor to:
receive a control signal that indicates a radio resource management configuration associated with one or more measurement thresholds for managing one or more wireless communication links at the wireless device;
receive one or more synchronization signals;
perform one or more measurements for the one or more synchronization signals in accordance with the radio resource management configuration;
generate one or more modified measurements based at least in part on applying a gain to the one or more measurements, wherein the gain is based at least in part on a quantity of radio frequency chains to be used for communicating via the one or more wireless communication links at the wireless device;
transmit a measurement report based at least in part on the one or more modified measurements satisfying the one or more measurement thresholds; and
receive an additional control signal instructing the wireless device to manage the one or more wireless communication links based at least in part on the measurement report.

* * * * *